(12) United States Patent
Maeda

(10) Patent No.: US 9,320,358 B2
(45) Date of Patent: Apr. 26, 2016

(54) SEAT RECLINING APPARATUS

(71) Applicant: SHIROKI CORPORATION, Kanagawa (JP)

(72) Inventor: Noriaki Maeda, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 58 days.

(21) Appl. No.: 14/041,135

(22) Filed: Sep. 30, 2013

(65) Prior Publication Data
US 2014/0091607 A1 Apr. 3, 2014

(30) Foreign Application Priority Data

Oct. 2, 2012 (JP) .................. 2012-220781

(51) Int. Cl.
*A47C 1/024* (2006.01)
*B60N 2/235* (2006.01)

(52) U.S. Cl.
CPC ............... *A47C 1/024* (2013.01); *B60N 2/2356* (2013.01)

(58) Field of Classification Search
CPC ............................. A47C 1/024; B60N 2/2356
USPC .................. 297/354.12, 366, 367 P
See application file for complete search history.

(56) References Cited

U.S. PATENT DOCUMENTS

| 4,836,607 | A * | 6/1989 | Kluting ............... 297/354.12 |
| 7,950,742 | B2 * | 5/2011 | Endo et al. ............. 297/367 P |
| 8,231,176 | B2 * | 7/2012 | Mitsuhashi ............ 297/367 R |
| 2009/0250990 | A1 * | 10/2009 | Endo et al. ............. 297/367 P |
| 2009/0289488 | A1 * | 11/2009 | Mitsuhashi ............ 297/354.12 |
| 2010/0117429 | A1 * | 5/2010 | Mitsuhashi ............ 297/354.12 |
| 2010/0269615 | A1 * | 10/2010 | Endou et al. ............ 74/409 |
| 2011/0012414 | A1 * | 1/2011 | Yamada et al. ......... 297/367 P |
| 2011/0089735 | A1 * | 4/2011 | Steffen et al. .......... 297/354.12 |
| 2011/0115271 | A1 * | 5/2011 | Yamada et al. ......... 297/367 P |
| 2012/0119555 | A1 * | 5/2012 | Aktas ..................... 297/366 |
| 2013/0161994 | A1 | 6/2013 | Ito et al. |
| 2014/0091607 | A1 * | 4/2014 | Maeda .................... 297/354.12 |

FOREIGN PATENT DOCUMENTS

JP 2012 051466 3/2012

* cited by examiner

*Primary Examiner* — Timothy J Brindley
(74) *Attorney, Agent, or Firm* — Millen, White, Zelano & Branigan, P.C.

(57) ABSTRACT

A seat reclining apparatus includes a first and second plates and a lock mechanism which locks/unlocks relative rotation therebetween. The first plate includes an engaging protrusion on a side engaged in a holding portion, and a protrusion-corresponding recess formed on the other side of the first plate recessed at a position corresponding to the engaging protrusion. The engaging protrusion includes a pressure receiving portion on a peripheral edge thereof and engages with an inner peripheral surface of the holding portion to receive a force therefrom when a load is exerted on a seatback frame in the locked state. The first plate includes an annular bridging portion connecting the peripheral edges of the engaging protrusion and the protrusion-corresponding recess; the annular bridging portion including a thin-wall portion, and a thick-wall portion corresponding to the pressure receiving portion.

4 Claims, 17 Drawing Sheets

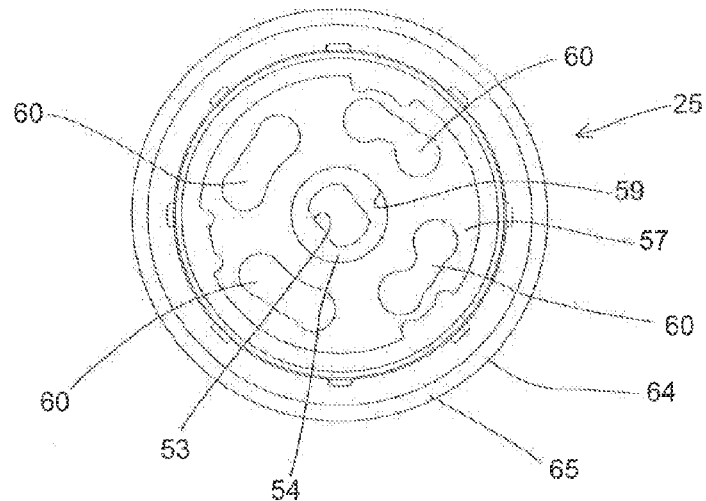
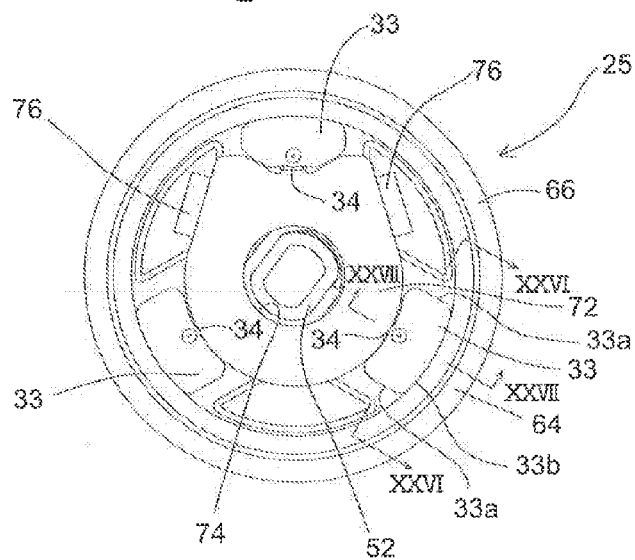
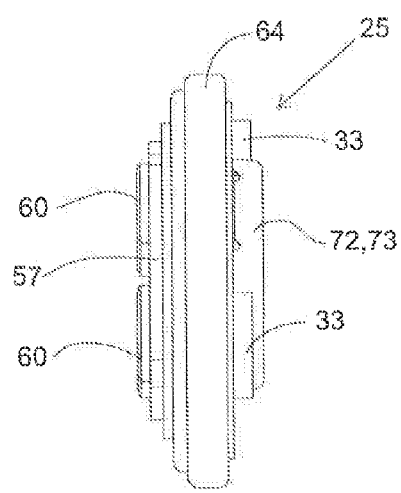

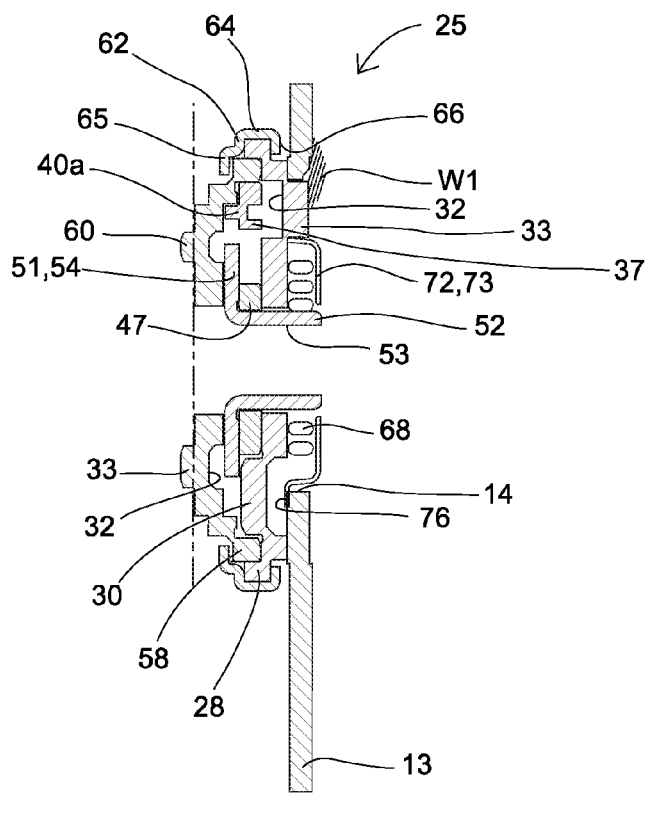
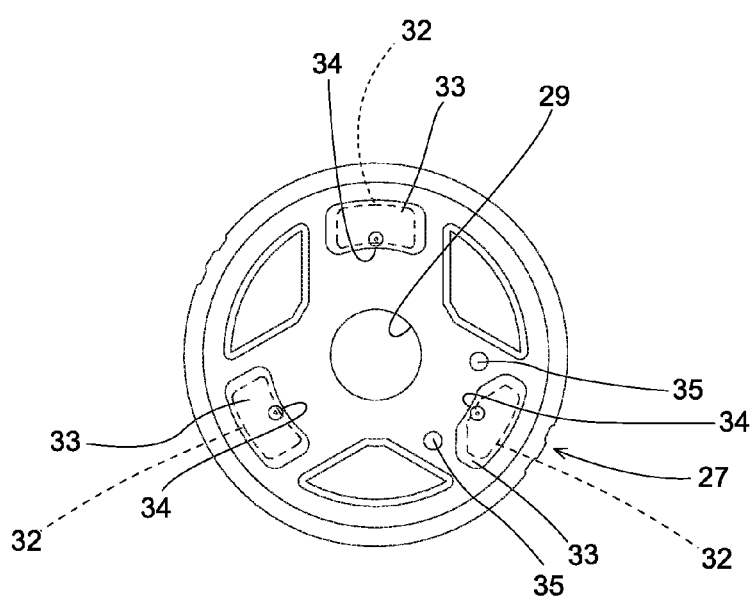

Rear ← → Front

SEAT RECLINING APPARATUS

BACKGROUND OF THE INVENTION

1. Field of the Invention

The present invention relates to a seat reclining apparatus for adjustment of the seatback angle of a reclining seat.

2. Description of Related Art

Japanese Unexamined Patent Publication No. 2012-51466 discloses a known seat reclining apparatus which includes a base plate which is fixed to a seat cushion frame, a ratchet plate (ratchet) which is fixed to a seatback frame and provided on the inner periphery thereof with an annular internal gear, a rotational center shaft (hand-operated shaft) for the base plate and the ratchet plate, a plurality of (three) lock members (pawls) which are supported on an inner side of the base plate (a surface of the base plate which faces the ratchet plate) thereby to be movable (slidable) relative to the base plate in radial directions of the rotational center shaft, a rotational cam which rotates with the rotational center shaft, and a lock spring (spiral spring) which biases and rotates the rotational center shaft.

An outer toothed portion is formed on an outer peripheral surface of each lock member. Each lock member is movable relative to the base plate (the associated guide groove) between an engaged position in which the outer toothed portion is engaged with the internal gear of the ratchet plate and a disengaged position in which the outer toothed portion is disengaged radially inwards from the internal gear of the ratchet plate.

The rotational cam is rotatable between a locked position to position each lock member in the engaged position and an unlocked position to position each lock member in the disengaged position. The lock spring biases the rotational center shaft in a direction to rotate the rotational cam toward the locked position.

Welding protrusions are protruded from an outer side of the base plate (a surface of the base plate which faces the seat cushion frame). The welding protrusions can be engaged in a holding portion which is formed in the seat cushion frame as a through-hole (note that neither the seat cushion frame nor the holding portion is disclosed in Japanese Unexamined Patent Publication No. 2012-51466). The welding protrusions are fixed to the seat cushion frame by welding a weld zone (fixed portion) which is formed on a portion of the peripheral edge of each welding protrusion to a portion of the peripheral edge of the aforementioned holding portion of the seat cushion frame. In addition, a pressure receiving portion which is formed on another portion of the peripheral edge of each welding protrusion comes in contact with another portion of the peripheral edge of the aforementioned holding portion.

When an operating lever (hand-operated lever) which is linked with the rotational center shaft is not manually rotated, the rotational cam rotates toward the locked position by the rotational biasing force of the lock spring, which causes each lock member to move toward the engaged position. Accordingly, the outer toothed portion of each lock member is engaged with the internal gear of the ratchet plate, so that the seatback frame (seatback) becomes nonrotatable relative to the seat cushion frame (seat cushion).

On the other hand, when the operating lever is manually rotated against the rotational biasing force of the lock spring, the rotational cam moves to the unlocked position. Thereupon, each lock member is at (has been moved to) the engaged position moves toward the disengaged position, which causes the outer toothed portion of each lock member to be disengaged from the internal gear of the ratchet plate. As a result, the seatback frame (seatback) becomes rotatable relative to the seat cushion frame (seat cushion) (i.e., the angle of the seatback becomes adjustable relative to the seat cushion).

Additionally, if a collision load occurs between the pressure receiving portions of the welding protrusions and the peripheral edge of the holding portion of the seat cushion frame by a rotation of the seatback frame (seatback) relative to the seat cushion frame (seat cushion) in the seat reclining apparatus in a locked state due to, e.g., a vehicle which incorporates the seat reclining apparatus colliding with another vehicle, the pressure receiving portions of the welding protrusions and the peripheral edge of the holding portion of the seat cushion frame receive this collision load.

In general, the base plate is produced by press-forming a metal plate using a mold having molding depressions (depressed portions) and a mold having molding protrusions (protruded portions). Accordingly, the aforementioned welding protrusions, which are molded in the molding depressions of the former mold thereby, are formed on the outer side of the base plate, while depressions (protrusion-corresponding depressions) which are molded by the molding protrusions of the latter mold (to be recessed toward the welding protrusions) are formed on the inner side of the base plate at positions corresponding to the positions of the welding protrusions. An annular bridging portion is formed at a portion of the base plate which connects the peripheral edge of each welding protrusion and the peripheral edge of the associated protrusion-corresponding depression.

Since the pressure receiving portions of the welding protrusions are for receiving loads such as a collision load as described above, it is desirable that the aforementioned annular bridging portion, which correspond to the pressure receiving portions, be formed to have a large wall thickness (greater than portions of the base plate which correspond to the welding protrusions).

However, in a known base plate, the wall thickness of the aforementioned annular bridging portion and the cross sectional shape of the outer peripheral portion of each welding protrusion are the same at any circumferential position of this welding protrusion, thus not being appropriately shaped according to each circumferential position thereof.

SUMMARY OF THE INVENTION

The present invention provides a seat reclining apparatus, wherein, in the case where at least one engaging protrusion and corresponding at least one protrusion-corresponding depression are formed as a pair on both sides of a first plate (the base plate) by press-forming, respectively, when a load occurs between the pressure receiving portion(s) of the welding protrusion(s) and the peripheral edge of the holding portion that is formed on one of the seat cushion frame and the seatback frame due to the seatback frame being manually rotated, etc., the pressure receiving portion(s) of the welding protrusion(s) can securely receive this load.

According to an aspect of the present invention, a seat reclining apparatus is provided, including a first plate which is fixed to one of a seat cushion frame and a seatback frame; a second plate which is fixed to the other of the seat cushion frame and the seatback frame to be rotatable relative to the first plate; and a lock mechanism which switches between a locked state in which the first plate and the second plate are prevented from rotating relative to each other and an unlocked state in which the first plate and the second plate are allowed to rotate relative to each other. The first plate includes an engaging protrusion which is formed on one side of the first plate and fixedly engaged in a holding portion which is formed in the one of the seat cushion frame and the seatback frame as one of a through-hole and a bottomed hole; and a protrusion-corresponding recess which is formed on the other side of the first plate to be recessed toward the one side of the first plate at a position corresponding to the engaging protrusion. The engaging protrusion includes a pressure receiving portion which is formed on a peripheral edge of the engaging protrusion and engages with an inner peripheral surface of the holding portion to receive a force from the holding portion when a load is exerted on the seatback frame in the locked state. The first plate includes an annular bridging portion which connects the peripheral edge of the engaging protrusion and a peripheral edge of the protrusion-corresponding recess to each other, the annular bridging portion including a thin-wall portion and a thick-wall portion which is greater in wall thickness than the thin-wall portion and formed at a position corresponding to the pressure receiving portion.

In the seat reclining apparatus according to the present invention, the engaging protrusion, which is fixedly engaged in the holding portion (which consists of a through-hole or a bottomed hole that is formed on one of the seat cushion frame and the seatback frame), is formed on one side of the first plate, and the shape of each portion of the peripheral edge of each engaging protrusion is formed into an appropriate shape.

Specifically, the first plate is made by press-forming so that the portion of the bridging portion which is formed at a position corresponding to the pressure receiving portion is formed as a thick-wall portion which is thicker than the thin-wall portion. Accordingly, the mechanical strength of the pressure receiving portion can be increased (to be greater than the fixed portion). Consequently, when a load occurs between the pressure receiving portion and the holding portion due to, e.g., a vehicle which incorporates the seat reclining apparatus colliding with another vehicle, the pressure receiving portion can securely receive this load.

It is desirable for the pressure receiving portion to include a pair of pressure receiving portions which are spaced from each other in a circumferential direction about a rotational center of the first plate and the second plate which rotate relative to each other. Accordingly, each pressure receiving portion is formed at a portion of the engaging protrusion which is most subjected to a force (collision load) upon a collision, etc., of the vehicle (which incorporates the seat reclining apparatus), and accordingly, the effect obtained by enhancing the mechanical strength of each pressure receiving portion (by applying the present invention to the seat reclining apparatus) further increases. In addition, if the seat cushion frame and the seatback frame rotate in two directions relative to each other due to, e.g., a collision of the vehicle to thereby cause loads in the two directions to occur between the pair of pressure receiving portions and the holding portion, these loads in the two directions can be received by the pair of pressure receiving portions.

It is desirable for the pressure receiving portion(s) to include a flat surface, and for a portion(s) of the inner peripheral surface of the holding portion which faces the pressure receiving portion(s) to include a flat surface.

Accordingly, it is possible to secure a large contact area between the holding portion, which is formed on one of the seat cushion frame and the seatback frame, and the pressure receiving portion(s) of the engaging protrusion, which is formed on the first plate. Accordingly, when a collision load occurs between the pressure receiving portion(s) of the engaging protrusion and the inner peripheral surface of the holding portion due to, e.g., a vehicle which incorporates the seat reclining apparatus colliding with another vehicle, resistance to this collision load is improved.

It is desirable for the peripheral edge of the engaging protrusion to include a fixed portion which is formed at a position corresponding to the thin-wall portion and fixed to the holding portion.

Accordingly, the first plate is made by press-forming so that a portion of the bridging portion which corresponds to the fixed portion is formed into a thin-wall portion, so that the fixed portion easily has a cross sectional shape which reduces the clearance between the holding portion (hole) and the fixed portion (i.e., a right-angled cross sectional shape, or a cross sectional shape similar to this right-angled cross sectional shape). Accordingly, the engaging protrusion (the fixed portion) can be easily securely fixed to the holding portion (hole) by welding or the like.

The present disclosure relates to subject matter contained in Japanese Patent Application No. 2012-220781 (filed on Oct. 2, 2012) which is expressly incorporated herein by reference in its entirety.

BRIEF DESCRIPTION OF THE DRAWINGS

The present invention will be discussed below in detail with reference to the accompanying drawings, in which:

FIG. 3 is a left-side elevational view of the seat reclining apparatus;

FIG. 4 is a right-side elevational view of the seat reclining apparatus;

FIG. 5 is a rear elevational view of the seat reclining apparatus;

FIG. 12 is a cross sectional view taken along the line XII-XII shown in FIG. 7, viewed in the direction of the appended arrows;

FIG. 13 is an external side (right-side) elevational view of a base plate shown in FIG. 2, etc.;

DESCRIPTION OF THE EMBODIMENTS

Figure 1:
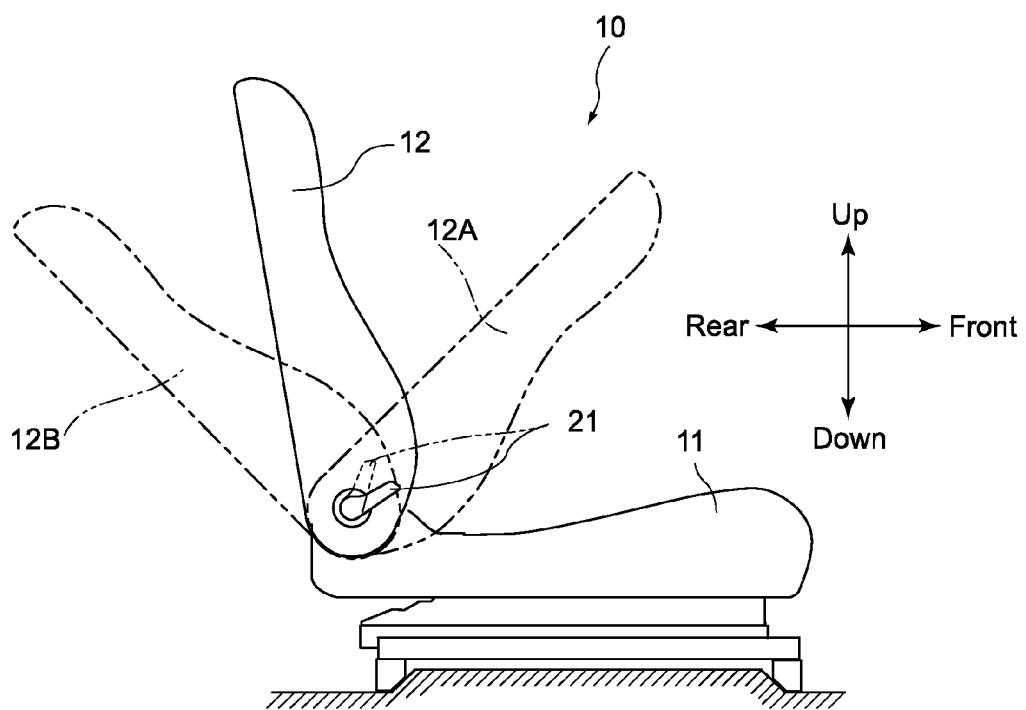
FIG. 1 is a side elevational view of a vehicle seat to which an embodiment of a seat reclining apparatus according to the present invention has been applied.

An embodiment the present invention will be hereinafter discussed with reference to FIGS. 1 through 29B. Directions described in the following description are defined based on the directions of arrows shown in the drawings. In the following description, the term "inner peripheral side" refers to the center side of a base plate 27 of the seat reclining apparatus 25 and the term "outer peripheral side" refers to the radially opposite side of the base plate 27 from the center side thereof.

A vehicle seat 10 shown in FIG. 1 is a right-side seat and is provided with a seat cushion 11 which is supported by a vehicle interior floor of a vehicle (e.g., an automobile) via a seat rail, and a seatback 12 which is rotatable relative to (pivoted at) the rear of the seat cushion 11. A pair of left and right seat cushion frames, made of metal, are installed inside the seat cushion 11 in a fixed state. Each seat cushion frame is a plate-shaped member extending in the forward/rearward direction (horizontal direction with respect to FIG. 1), and the rear end of each seat cushion frame includes a rear frame (seat cushion frame) 13 (see FIG. 2, etc.), made of metal, which projects upward. The rear frame 13 is provided with a seat-cushion-side connecting hole 14 formed as a circular through-hole with three engaging holes 15 formed at intervals of 120 degrees (i.e. at equi-angular intervals) at the circumference thereof. The three engaging holes 15 are formed in such a manner to be recessed radially outwards from the circumference of the seat-cushion-side connecting hole 14. Each engaging hole 15 is substantially rectangular in shape, and both ends of each engaging hole 15 in the lengthwise direction thereof (circumferential direction about the center of the seat-cushion-side connecting hole 14) are formed by two flat portions 15a which are parallel to each other. The vehicle seat 10 is provided inside the seatback 12 with a pair of left and right seatback frames 16 (only a lower part of the right seatback frame 16 is shown by two-dot chain lines in FIG. 2) made of metal which are installed in a fixed state (see FIG. 2). Each seatback frame 16 is a plate-shaped member extending in the lengthwise direction of the seatback 12. Each seatback frame 16 is provided, in a lower portion thereof (which becomes a rear portion thereof when the seatback 12 is tilted forward), with a seatback-side connecting hole 17 formed as a through-hole which includes of a substantially square-shaped hole and a total of four fitting holes 18 which are respectively formed on the four sides of the aforementioned square-shaped hole. Each fitting hole 18 is substantially rectangular in shape.

The left and right rear frames 13 are installed in the internal space of the seatback 12. The left and right seatback side frames 16 are positioned in between the left and right rear frames 13. The left seatback side frame 16 and the left rear frames 13 face each other in the leftward/rightward direction (vehicle widthwise direction) and the right seatback side frame 16 and the right rear frames 13 face each other in the leftward/rightward direction (vehicle widthwise direction). The left rear frame 13 and the left seatback side frame 16 are connected to each other to be rotatable via a rotational connecting shaft (not shown). On the other hand, the right rear frame 13 and the right seatback side frame 16 are connected to each other via a seat reclining apparatus 25 to be rotatable about an axis extending in the leftward/rightward direction.

The seatback 12 (the seatback side frames 16) is rotatable about the aforementioned rotational connecting shaft and the seat reclining apparatus 25 relative to the seat cushion 11 (the rear frames 13). Specifically, the seatback 12 (the seatback side frames 16) is rotatable between a forwardly-tilted position shown by a two-dot chain line designated by 12A in FIG. 1 and a rearward-tilted position shown by a solid line designated by 12B in FIG. 1.

The detailed structure of the seat reclining apparatus 25 will be discussed hereinafter.

The seat reclining apparatus 25 is provided with the base plate (first plate) 27, two lock members (pawls) 36, a lock member (pawl) 37, a wedge 41, a rotational cam 47, a rotational center shaft 51, a ratchet plate 57, a retaining ring 64 a lock spring 68 and a spring cover 72 which are major elements of the seat reclining apparatus 25.

Figure 26:
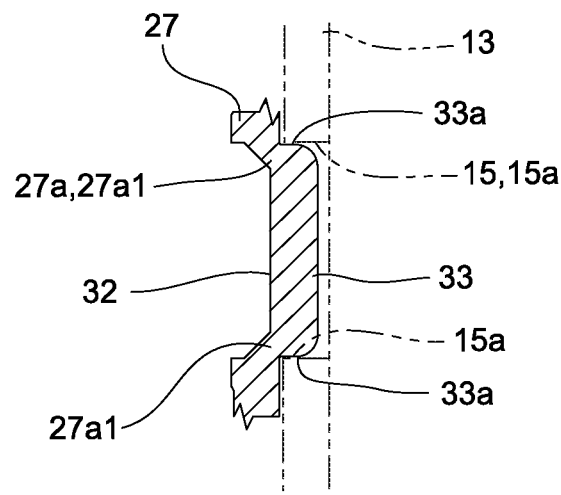
FIG. 26 is a cross sectional view taken along the line XXVI-XXVI shown in FIG. 4.
Figure 27:
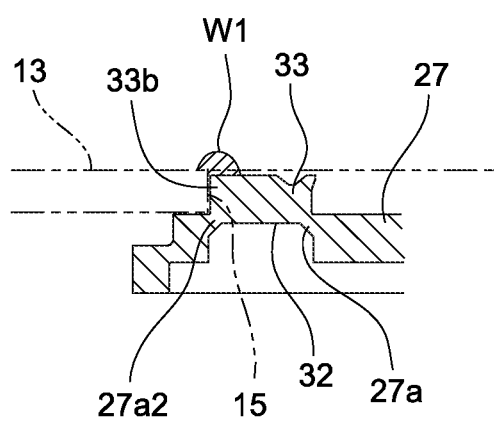
FIG. 27 is a cross sectional view taken along the line XXVII-XXVII shown in FIG. 4.
Figure 28A:
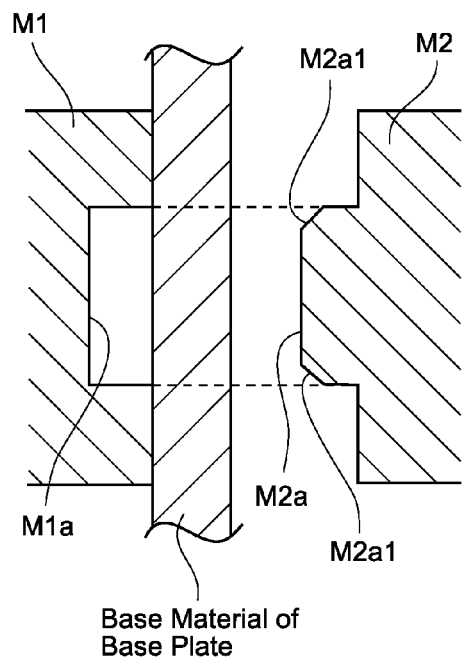
FIG. 28A is a cross sectional view of a portion of the base material of the base plate and portions of the associated molds, taken along the same plane as FIG. 26, showing a state of the base plate when the base plate is made by press-forming and showing a state where the movable mold is spaced from the base material of the base plate supported by the fixed mold.
Figure 28B:
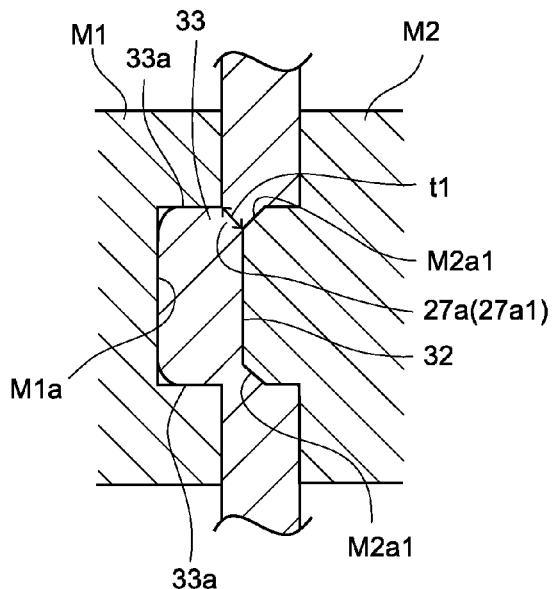
FIG. 28B is a cross sectional view of a portion of the base material of the base plate and portions of the associated molds, taken along the same plane as FIG. 26, showing a state of the base plate when the base plate is made by press-forming and showing a state where the movable mold is close to the fixed mold.

The base plate 27 is a metal disk member which is formed by press molding (press-forming) using a pair of molds (molding dies): a fixed mold M1 and a movable mold M2 (see FIGS. 28 and 29). The base plate 27 is provided on the outer edge of the left side thereof with a projecting large-diameter annular flange 28. The base plate 27 is provided with an accommodation space radially inside of the large-diameter annular flange 28. The base plate 27 is provided at a center thereof with a bearing hole 29 formed as a through-hole which is circular in cross sectional shape. The base plate 27 is provided on the left side thereof with three groove-forming projections 30 (see FIGS. 21 through 24) which project and are arranged at intervals of 120 degrees about the bearing hole 29. Each groove-forming projection 30 is substantially in the shape of a sector. The three groove-forming projections 30 are formed by pressing the right side of the base plate 27 leftward using a mold when the base plate 27 is formed by press molding. As shown in the drawings, a circular-arc-shaped clearance is formed between the outer periphery of each groove-forming projection 30 and the large-diameter annular flange 28. Both side surfaces of each groove-forming projection 30 (with respect to the circumferential direction of the base plate 27) are formed as flat guide surfaces 30a, and the flat guide surfaces 30a (opposed surfaces) of any two adjacent groove-forming projections 30 (which face each other in the circumferential direction) are parallel to each other, and a guide groove 31 is formed therebetween. The base plate 27 is further provided, on the right side thereof on the opposite sides from the three guide grooves 31, with a total of three welding protrusions (engaging protrusions) 33 (see FIGS. 2, 4, 6, etc.), respectively, which project rightward. The three welding protrusions 33 are formed by pressing the bottoms (left side surfaces) of the three guide grooves 31 rightward by a mold when the base plate 27 is formed by press molding. The base plate 27 is further provided at the bases of the three guide grooves 31 with three protrusion-corresponding recesses (protrusion-corresponding depressions) 32 which are formed by a mold on the opposite sides from the three welding protrusions 33, respectively (see FIGS. 8, 9, 10, 12 and 13). In addition, as shown in FIGS. 26 through 28B, a portion of the base plate 27 which connects the peripheral edges of each welding protrusion 33 and the associated protrusion-corresponding recess 32 to each other as a pair is formed into a bridging portion 27a that is annular in shape (as viewed from a side). Each welding protrusion 33 is substantially rectangular in shape, and both end surfaces (peripheral edges; portions lying on a circle about the shaft support hole 29 which passes through a central part of each welding protrusion 33 as viewed from a side) of each welding protrusion 33 in the lengthwise direction (long-side direction) thereof are formed as side end surfaces (pressure receiving portions) 33a which are flat surfaces parallel to each other. One of the peripheral edges of each welding protrusion 33 in the short-side direction thereof (the peripheral edge of each welding protrusion 33 on the outer peripheral side of the base plate 27) is formed as a weld zone (fixed portion) 33b. In addition, a retaining projection 34 is formed on a center portion of the inner periphery of each welding protrusion 33 to project slightly toward the center of the base plate 27 (toward the inner peripheral side). The base plate 27 is further provided, on the right side thereof in the vicinity of the front welding protrusion 33 (the right welding protrusion 33 with respect to FIG. 13), with a pair of lock projections 35 which project rightward (see FIGS. 2, 13 and 14).

The fixed mold M1 has three molding depressions M1a (only one of which is shown in FIGS. 28A through 29B), the cross sectional shapes (side shapes) of which are substantially identical to the side shapes of the three welding protrusions 33, and the movable mold M2 has three molding protrusions M2a (only one of which is shown in FIGS. 28A and 28B, and 29A and 29B), the cross sectional shapes (side shapes) of which are substantially identical to the side shapes of the three protrusion-corresponding recesses 32. As shown in FIGS. 28A through 29B, the inner peripheral surface of each molding depression M1a is orthogonal to the base surface and the molding surface of the associated fixed mold M1. On the other hand, the cross sectional shape of the peripheral edge of the end (the left end with respect to FIGS. 28A through 29B) of each molding protrusion M2a varies according to positions in a circumferential direction of this molding protrusion M2a. Specifically, as shown in FIGS. 28A through 29B, first inclined surfaces M2a1 that are formed of gently-inclined surfaces are formed on portions of each molding protrusion M2a (both ends of each molding protrusion M2a in the lengthwise direction thereof) which correspond to the side end surfaces 33a of each welding protrusion 33, respectively, while a second inclined surface M2a2 that is formed of a steep inclined surface (greater in angle of inclination than the first inclined surfaces M2a1) is formed on a portion (an end of each molding protrusion M2a in the short-side direction thereof) of each molding protrusion M2a which corresponds to the weld zone 33b of each welding protrusion 33. Additionally, another second inclined surface M2a2 that is formed as a steep inclined surface (greater in angle of inclination than the first inclined surfaces M2a1) is formed on another portion (the other end of each molding protrusion M2a in the short-side direction thereof) of each molding protrusion M2a on the opposite side (the lower side with respect to FIGS. 29A and 29B) from the weld zone 33b.

Figure 29A:
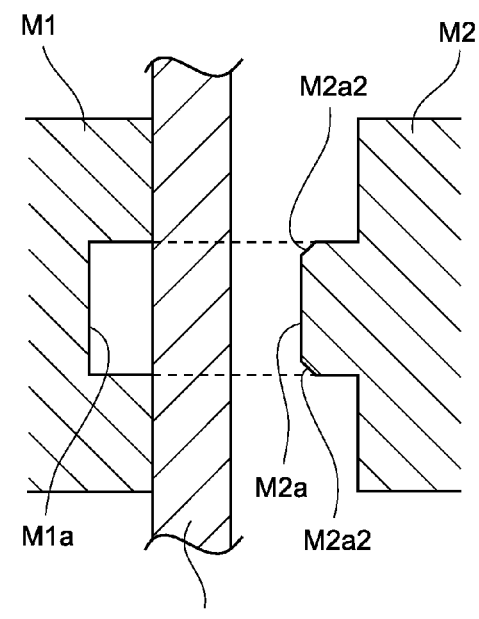
FIG. 29A is a cross sectional view of a portion of the base material of the base plate and portions of the associated molds, taken along the same plane as FIG. 27, showing a state of the base plate when the base plate is made by press-forming and showing a state the movable mold is spaced from the base material of the base plate supported by the fixed mold.
Figure 29B:
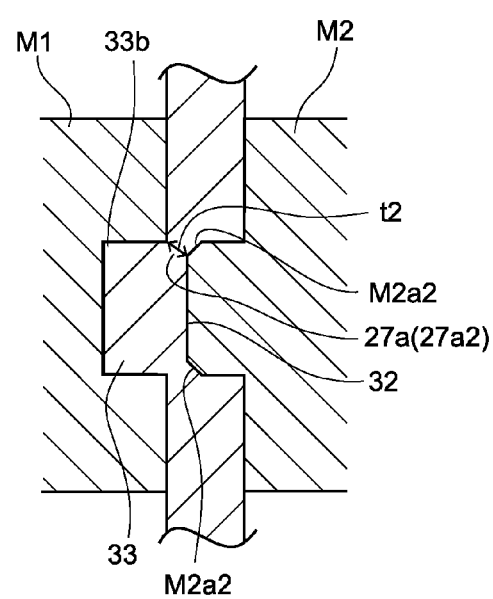
FIG. 29B is a cross sectional view of a portion of the base material of the base plate and portions of the associated molds, taken along the same plane as FIG. 27, showing a state where the movable mold is close to the fixed mold.

As shown in FIGS. 28A and 28B, the base plate 27 is formed by bringing the molding surface of the movable mold M2 (the surface thereof from which each molding protrusion M2a is protruded) close to the molding surface of the fixed mold M1 with the right side of the base material of the base plate 27 mounted on the molding surface (in which each molding depression M1a is formed) of the fixed mold M1, and thereafter moving the movable mold M2 away from the fixed mold M1. Upon the base plate 27 being press-formed in this manner, the cross sectional shape of the peripheral edge of the right end (the left end with respect to FIGS. 28B and 29B) of each welding protrusion 33 varies according to positions in a circumferential direction of this welding protrusion 33 as shown in FIGS. 28B and 29B. Specifically, the side end surfaces 33a of each welding protrusion 33, which are portions of each welding protrusion 33 which correspond to the first inclined surfaces M2a1 of the associated molding protrusion M2a of the movable mold M2, are somewhat round in cross sectional shape as shown in FIGS. 26 and 28B, whereas the right end (the left end with respect to FIG. 29B) of the weld zone 33b of each welding protrusion 33, which is a portion of each welding protrusion 33 which corresponds to the second inclined surfaces M2a2 of the associated molding protrusion M2a of the movable mold M2, is substantially right-angled in cross sectional shape as shown in FIGS. 27 and 29B (another portion of each welding protrusion 33 on the inner peripheral side thereof is also right-angled in cross sectional shape). Additionally, as shown in FIGS. 28B and 29B, the cross sectional shape (thickness) of each bridging portion 27a (each of the three bridging portions 27a for the three welding protrusions 33) varies according to positions in a circumferential direction of this welding protrusion 33. Specifically, the thickness t1 (see FIG. 28B) of a portion (thick-wall portion) 27a1 of the bridging portion 27a which corresponds to the first inclined surfaces M2a1 (the side end surfaces 33a) of the associated molding protrusion M2a of the movable mold M2 is greater than the thickness t2 (see FIG. 29B) of another portion (thin-wall portion) 27a2 of the bridging portion 27a which corresponds to the second inclined surfaces M2a2 (the weld zone 33b) of the associated molding protrusion M2a of the movable mold M2.

Figure 21:
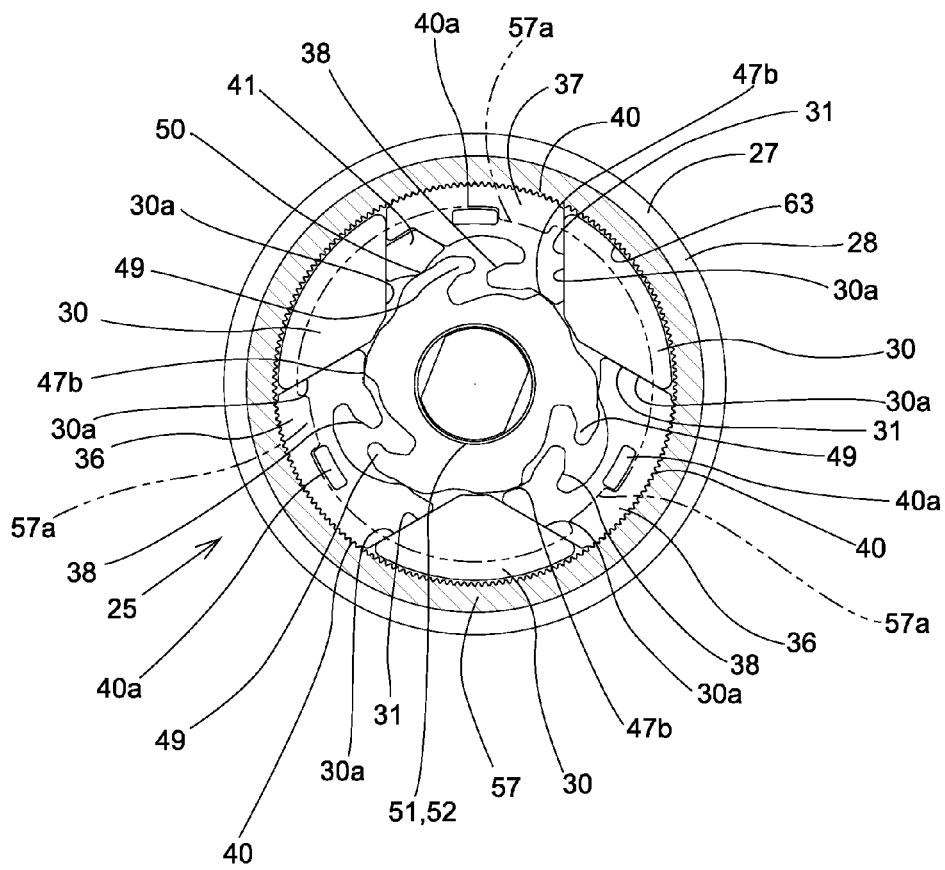
FIG. 21 is a cross sectional view taken along the line XXI-XXI shown in FIG. 8, viewed in the direction of the appended arrows, from which the seat cushion, a retaining ring, anti-rotation pins and an annular flange are removed for clarity.

The two lock members 36 are installed in two of the three guide grooves 31, specifically in the front guide groove 31 (the left guide groove 31 with respect to FIG. 21) and the rear guide groove 31 (the right guide groove 31 with respect to FIG. 21), and the lock member 37 and the wedge 41 are installed in the upper guide groove 31 (the upper guide groove 31 with respect to FIG. 21).

Figure 24:
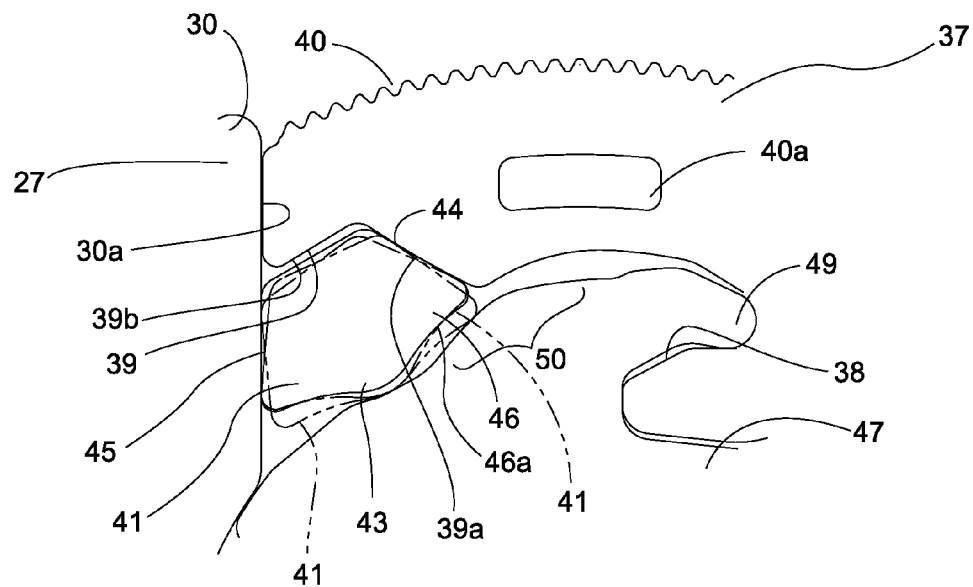
FIG. 24 is an enlarged view of a portion of the seat reclining apparatus which is designated by the Roman numeral XI shown in FIG. 22.

The two lock members 36 and the lock member 37 are press-molded products made of metal plates, and the thicknesses of the three lock members 36 and 37 are substantially the same as the depths of the three guide grooves 31. A cam groove 38 is formed in each of the three lock members 36 and 37, while a wedge-engaging groove 39 is formed only in the lock member 37. As shown in FIG. 24, the wedge-engaging groove 39 is provided with a circumferential parallel portion 39b, which extends substantially parallel to the circumferential direction about the axis of the base plate 27, and a pressed portion (pressure-receiving portion/abutment portion) 39a, which extends obliquely toward the inner peripheral side from one end (the right end with respect to FIG. 24) of the circumferential parallel portion 39b. The pressed portion 39a is not linear (flat) in shape, but rather is a curved surface which is convex toward the space formed by the wedge-engaging groove 39 (toward the wedge 41; toward the left down side with respect to FIG. 24) (however, the curvature of the pressed portion 39a is extremely small, so that the pressed portion 39a appears to be substantially straight to the naked eye). The two lock members 36 and the lock member 37 are each provided on the circular-arc-shaped outer peripheral surface thereof with an outer toothed portion 40. In addition, the right side surfaces of each lock member 36 and 37 are flat surfaces. Additionally, each lock member 36 and 37 is provided on the left side thereof with an engaging projection 40a which projects leftward and has a substantially rectangular cross sectional shape.

The wedge 41, which can be installed in the space formed by the wedge-engaging groove 39 of the wedge-engaging groove of the lock member 37, is a press-molded product made of a metal plate. The wedge 41 has smaller outside dimensions than the two lock members 36 and the lock member 37 and has substantially the same thickness as that of the two lock members 36 and the lock member 37.

Figure 25:
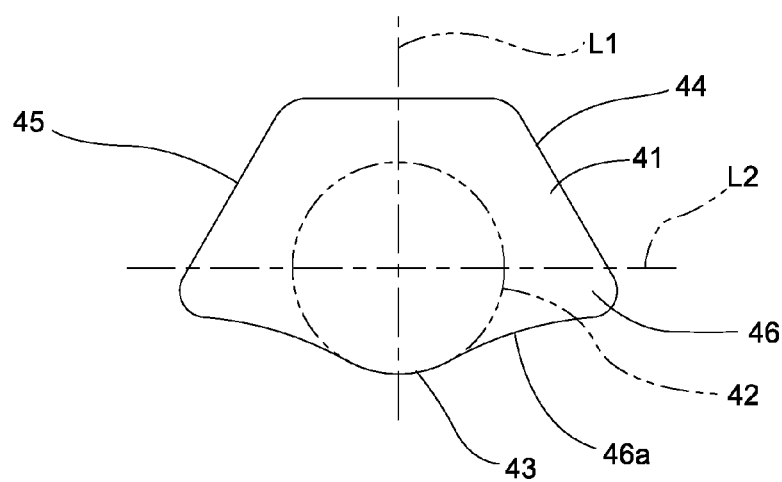
FIG. 25 is an enlarged view of a wedge shown in FIG. 2, etc.

The wedge 41 is symmetrical in shape with respect to a straight line L1 as shown in FIG. 25, and both the left and right sides of the wedge 41 lie flat on parallel planes. The wedge 41 is provided on the periphery thereof with an engaging portion 43, a pressing portion 44 and a slide-contact flat surface (surface contact portion) 45. The straight line L1 passes between the pressing portion 44 and the slide-contact flat surface 45. The peripheral surface of the engaging portion 43 is a circular arc surface which corresponds to a portion of an imaginary cylindrical surface 42 (the straight line L1 passing through the central axis thereof) positioned inside the wedge 41. The aforementioned curvature of the pressed portion 39a of the lock member 37 is smaller than the curvature of the engaging portion 43 of the wedge 41. The pressing portion 44 and the slide-contact flat surface 45 of the wedge 41, which are formed to be symmetrical with respect to the straight line L1, are positioned outside the imaginary cylindrical surface 42 and are each formed from a flat surface inclined to the straight line L1. The wedge 41 is further provided with a clearance-forming portion 46 which is positioned on the engaging portion 43 side (the lower side with respect to FIG. 25) of a straight line L2 which is orthogonal to the straight line L1 and passes through the axis of the imaginary cylindrical surface 42. The clearance-forming portion 46 is formed of a portion of the wedge 41 which is positioned on the engaging portion 43 side of a straight line L2 and positioned outside the imaginary cylindrical surface 42 (specifically on the right-hand side of the imaginary cylindrical surface 42 with respect to FIG. 25). A concave surface 46a (concave toward the inside of the wedge 41) which is continuous with the engaging portion 43 is formed on a peripheral surface of the clearance-forming portion 46.

Figure 22:
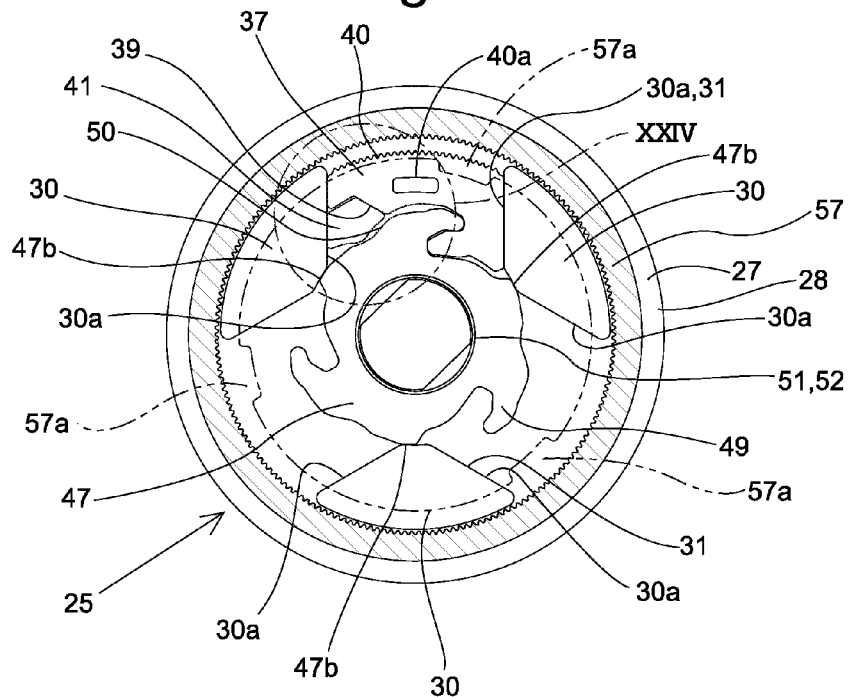
FIG. 22 is a view similar to that of FIG. 21, showing the seat reclining apparatus in an unlocked state from which two lock members are further removed for clarity.
Figure 23:
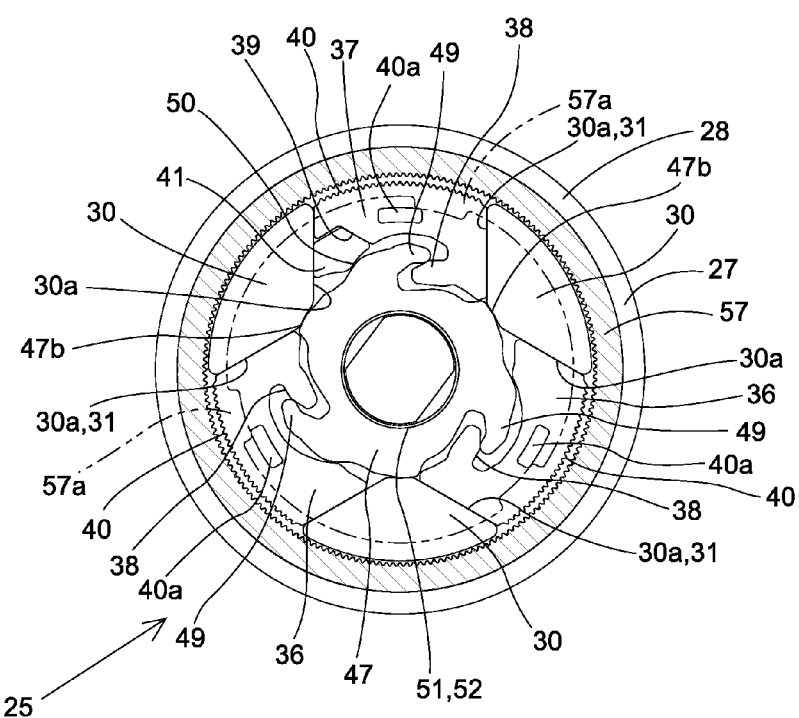
FIG. 23 is a view similar to that of FIG. 21, showing the seat reclining apparatus in an unlocked holding state.

The lock members 36, the lock member 37 and the wedge 41 are provided in the respective guide grooves 31 as shown in FIGS. 21 through 23. The right side surfaces of the lock members 36, the lock member 37 and the wedge 41 are all in surface contact with base (flat) surfaces (left side surfaces) of the guide grooves 31, respectively.

Figure 20:
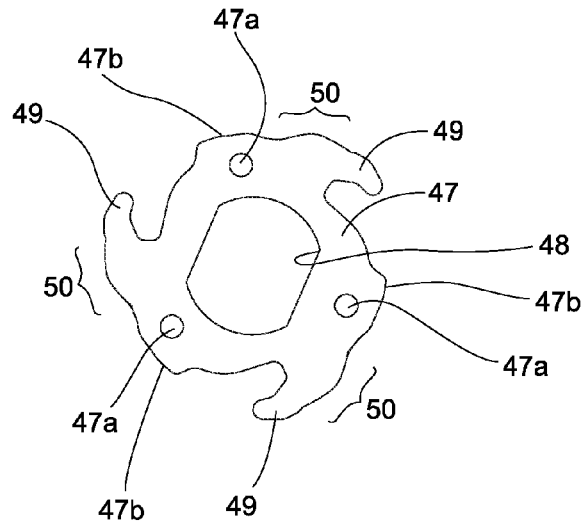
FIG. 20 is a left-side elevational view of a rotational cam (first cam) shown in FIG. 2, etc.

The rotational cam 47 is a press-molded product made of a metal plate and substantially identical in thickness to the three guide grooves 31. The rotational cam 47 is provided in the center thereof with a non-circular center hole 48, which is formed as a through-hole that is shaped as a circle with linearly cut-off opposite sides. The rotational cam 47 is provided, on the outer periphery thereof at intervals of 120 degrees, with three cam projections 49. As shown in the drawings, the rotational cam 47 is installed in the center of the aforementioned accommodation space of the base plate 27. As shown in FIG. 20, etc., the rotational cam 47 is provided, on the left side thereof at equi-angular intervals in the circumferential direction, with three rotation retaining projections 47a which project leftward. The three rotation retaining projections 47a are columnar in shape and mutually identical in specification. As shown in FIGS. 20 and 24, the rotational cam 47 is provided on the outer peripheries of the three cam projections 49 with three curved pressing surfaces 50, respectively, which are convex toward the outer peripheral side. The rotational cam 47 is further provided, on the outer periphery thereof at equi-angular intervals at different positions from the three curved pressing surfaces 50, with three lock-member pressing portions 47b.

The rotational center shaft 51 is made of metal and provided with a cam connecting shaft 52 and an annular flange 54.

The cam connecting shaft 52 is a tubular member having a non-circular cross section. Both ends of the cam connecting shaft 52 are open as clearly shown in FIG. 19. The cam connecting shaft 52 is geometrically similar in cross sectional shape to and slightly smaller in size than the non-circular center hole 48. The cam connecting shaft 52 is provided therein with a connecting hole 53 which is also geometrically similar in cross sectional shape to the non-circular center hole 48.

The annular flange 54 is integrally formed on the rotational center shaft 51 to project radially outwards from the left end of the cam connecting shaft 52. The annular flange 54 is in the shape of a flat plate orthogonal to the axis of the cam connecting shaft 52.

In addition, the annular flange 54 is provided at equi-angular intervals in the circumferential direction thereof with a total of six through-holes: a pair of small-diameter circular holes 55*a*, a pair of large-diameter through-holes 55*b* and a pair of elongated holes 55*c*. The pair of small-diameter circular holes 55*a* are circular holes identical in diameter to the three rotation retaining projections 47*a*. The pair of large-diameter through-holes 55*b* are circular holes slightly greater in diameter than the pair of small-diameter circular holes 55*a* (the rotation retaining projections 47*a*). The pair of elongated holes 55*c* are elongated holes which are shaped such that the minor diameter of each elongated hole 55*c* is identical to the diameter of each small-diameter circular hole 55*a* (each retaining projection 47*a*) and that the major diameter of each elongated hole 55*c* is greater than the diameter of each small-diameter circular hole 55*a* (each retaining projection 47*a*).

The rotational center shaft 51 is fixed to the rotational cam 47 with the two lock members 36, the lock member 37, the wedge 41 and the rotational cam 47 arranged in a clearance between the annular flange 54 and the base plate 27 and with the three rotation retaining projections 47*a* of the rotational cam 47 respectively engaged in one of the pair of small-diameter circular holes 55*a*, one of the pair of large-diameter through-holes 55*b* and one of the pair of elongated holes 55*c*. The cam connecting shaft 52 is loosely fitted into the non-circular center hole 48 of the rotational cam 47, and the end (right end) of the cam connecting shaft 52 projects rightward from the right side of the base plate 27 (see FIGS. 8 through 10). When the three rotation retaining projections 47*a* are engaged in one small-diameter circular hole 55*a*, one large-diameter through-hole 55*b* and one elongated hole 55*c*, respectively, play between the three rotation retaining projections 47*a* and the one small-diameter circular hole 55*a*, the one large-diameter through-hole 55*b* and the one elongated hole 55*c* substantially disappears, so that the rotational cam 47 and the rotational center shaft 51 become integral with each other (in other words, the rotational cam 47 and the rotational center shaft 51 are prevented from rotating relative to each other). Therefore, rotating the rotational center shaft 51 on the axis thereof relative to the base plate 27 (to the bearing hole 29) causes the rotational cam 47 to rotate with the rotational center shaft 51. In addition, since all the through-holes formed in the annular flange 54 are not formed as the small-diameter circular holes 55*a* but are formed in the above described manner, the three rotation retaining projections 47*a* can be easily fitted into three holes (one of the pair of small-diameter circular holes 55*a*, one of the pair of large-diameter through-holes 55*b* and one of the pair of elongated holes 55*c*) formed in the annular flange 54.

The ratchet plate 57 is a press-molded metal product which is shaped into a disk. The ratchet plate 57 is provided on the outer edge of the right side thereof with a small-diameter annular flange 58 having a circular shape, so that an accommodation space is formed radially inside the small-diameter annular flange 58 on the right side of the ratchet plate 57. The ratchet plate 57 is provided at the center thereof with a bearing hole 59 formed as a through-hole which is circular in cross sectional shape. The ratchet plate 57 is provided, on the left side thereof at intervals of 90 degrees in the circumferential direction about the bearing hole 59, with a total of four welding protrusions 60 which project leftward. The ratchet plate 57 is provided on the outer edge of the left side thereof with an annular stepped portion 62 (see FIGS. 8 through 10) that is positioned in the back of the small-diameter annular flange 58. In addition, the ratchet plate 57 is provided on an inner peripheral surface of the small-diameter annular flange 58 with an internal gear 63. The ratchet plate 57 is further provided, at equi-angular intervals in the circumferential direction thereof on an inner peripheral surface of the small-diameter annular flange 58 which is positioned one step to the left of the internal gear 63, with three unlocked-state holding projections 57*a* which project toward the inner peripheral side (see FIGS. 2 and 21 through 23). As shown in the drawings, the inner periphery of each unlocked-state holding projection 57*a* is in the shape of a circular arc, the curvature center of which corresponds to the axis of the ratchet plate 57. The ratchet plate 57 is installed to cover the left side of the base plate 27 with the small-diameter annular flange 58 inserted into a clearance between the inner periphery of the large-diameter annular flange 28 and the outer peripheries of the three groove-forming projections 30. When the ratchet plate 57 is made to cover the base plate 27, the left side of the annular flange 54 faces the bottom (right side) of the aforementioned accommodation space of the ratchet plate 57 with a clearance formed therebetween, which prevents the rotational center shaft 51 from tilting relative to the axial direction thereof and prevents the two lock members 36, the lock member 37, the wedge 41 and the rotational cam 47 from rattling in the aforementioned accommodation spaces of the base plate 27 and the ratchet plate 57 in the axial direction of the rotational center shaft 51.

The retaining ring 64 is an annular ring member made of metal. The retaining ring 64 has a slightly greater outer diameter than that of the base plate 27. The retaining ring 64 is provided at the left end thereof with an annular adjacent portion 65 which projects toward the inner peripheral side (see FIGS. 8 through 10). The retaining ring 64 is fitted on the outer edges of the base plate 27 and the ratchet plate 57 with the annular adjacent portion 65 positioned on (opposed to) the left side of the annular stepped portion 62. The retaining ring 64 is provided on the right end thereof with an annular swaging portion 66. The retaining ring 64 is fixed to the base plate 27 by swaging the annular swaging portion 66 against an annular recess formed on the perimeter of the right side of the base plate 27. Once the base plate 27 and the retaining ring 64 are integrated (fixed to each other), the ratchet plate 57 is positioned between the base plate 27 and the retaining ring 64 so that the ratchet plate 57 is rotatable relative to the base plate 27 and the retaining ring 64 about the rotational center shaft 51 without coming off the base plate 27 or the retaining plate 64.

The lock spring 68 is a spiral spring that is formed by winding a metal belt into a spiral and is installed on the right side of the base plate 27. The end (inner end) of the lock spring 68 on the inner peripheral side is formed as a first locking portion 69 that is formed by bending the inner end of the lock spring 68 into a linear shape. The end (outer end) of the lock spring 68 on the outer peripheral side is formed as a second locking portion 70 which extends in a direction substantially parallel to a radial direction of the lock spring 68.

Figure 14:
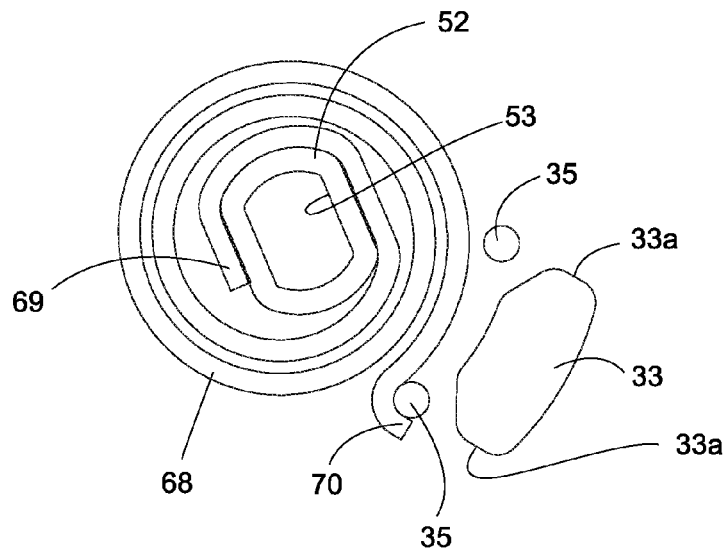
FIG. 14 is an enlarged side view of a portion of the base plate and a lock spring shown in FIG. 2, etc.
Figure 15:
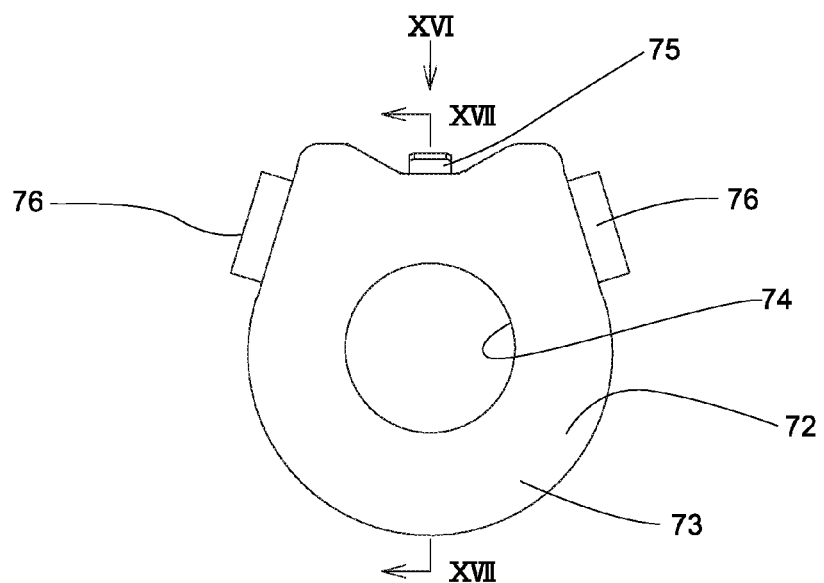
FIG. 15 is an enlarged side view of a spring cover shown in FIG. 2, etc.
Figure 16:
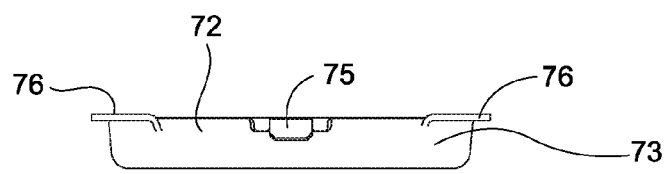
FIG. 16 shows of the spring cover, viewed in the direction of the arrow XVI shown in FIG. 15.
Figure 17:
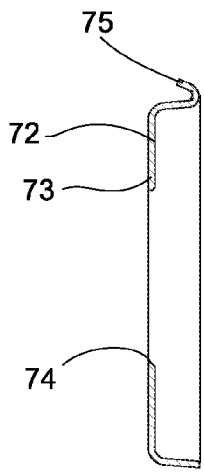
FIG. 17 is a cross sectional view taken along the line XVII-XVII shown in FIG. 15, viewed in the direction of the appended arrows.
Figure 18:
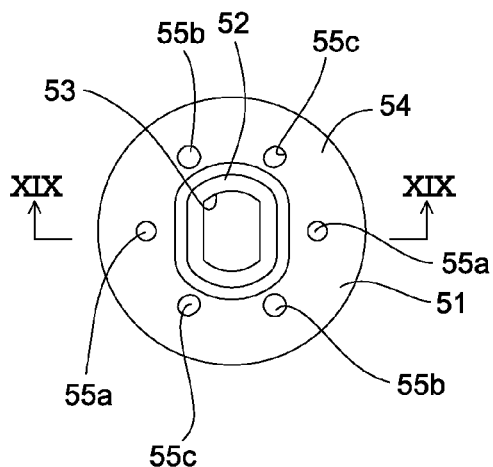
FIG. 18 is a right-side elevational view of a rotational center shaft shown in FIG. 2, etc.
Figure 19:
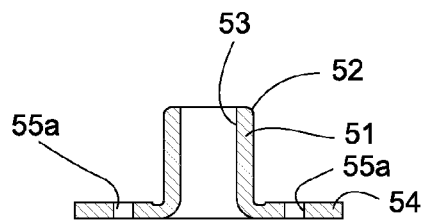
FIG. 19 is a cross sectional view taken along the line XIX-XIX shown in FIG. 18, viewed in the direction of the appended arrows.

The lock spring 68 is installed around the right end of the cam connecting shaft 52 that projects from the base plate 27. As shown in FIG. 14, the first locking portion 69 is locked onto a flat portion of the cam connecting shaft 52 which constitutes a portion of the outer periphery of the cam connecting shaft 52, while the second locking portion 70 is locked onto one of the locking projections 35.

When the lock spring 68 is installed onto the base plate 27 and the rotational center shaft 51 (the cam connecting shaft 52) in the above described manner, the lock spring 68 is slightly resiliently deformed to produce a biasing force that urges the rotational center shaft 51 to rotate in one direction. This biasing force urges the rotational center shaft 51 to rotate counterclockwise with respect to FIGS. 21 through 23, and accordingly, the rotational cam 47 is in the locked position shown in FIG. 21 when no external force other than the biasing force of the lock spring 68 is exerted on the rotational center shaft 51. When the rotational cam 47 is in the locked position, each lock-member pressing portion 47b presses the associated lock member 36 or 37 in a locking direction (toward the outer peripheral side). In addition, the curved pressing surface 50 of the specific cam projection 49 (specifically the upper cam projection 49 with respect to FIG. 21; the cam projection 49 shown in FIG. 24) of the rotational cam 47 presses the engaging portion 43 of the wedge 41 in a locking direction (toward the outer peripheral side), so that the wedge 41 slides toward the outer peripheral side of the base plate 27 while being guided by the flat guide surface 30a with which the slide-contact flat surface 45 of the wedge 41 is in surface contact, and the pressing portion 44 of the wedge 41 partly contacts and presses the pressed portion 39a with a large force. Therefore, the lock member 37 which is pressed both toward the flat guide surface 30a (which is positioned on the right-hand side of the lock member 37 with respect to FIG. 21) and in the locking direction moves to an engaged position in which the outer toothed portion 40 of the lock member 37 is engaged with internal gear 63 of the ratchet plate 57, so that the lock member 37 becomes immovable in the associated guide groove 31. On the other hand, since each of the two lock members 36 is allowed to move in a circumferential direction within a gap defined between the associated guide groove 31 and the associated lock member 36, each lock member 36 comes into engagement with the internal gear 63 of the ratchet plate 57 while moving (adjusting) in a circumferential direction within the gap defined between the associated guide groove 31 and the associated lock member 36. Accordingly, when the rotational cam 47 rotates to the locked position, each of the three lock members (the two lock members 36 and the lock member 37) securely performs a locking operation, so that the base plate 27 and the ratchet plate 57 are prevented from rotating relative to each other. In addition, the outer peripheral surfaces of the engaging projections 40a of the three lock members 36 and 37 are positioned closer to the outer peripheral side than the inner peripheral surfaces of the three unlocked-state holding projections 57a.

On the other hand, rotating the rotational center shaft 51 clockwise with respect to FIGS. 21 through 23 against the rotational biasing force of the lock spring 68 causes the rotational cam 47, which is in the locked position, to rotate to the unlocked position shown in FIG. 22. Thereupon, each of the three lock-member pressing portions 47b is disengaged from the associated lock member 36 or 37 toward the inner peripheral side, thus causing the curved pressing surface 50 of the specific cam projection 49 (specifically, the upper cam projection 49 with respect to FIG. 21) of the rotational cam 47 to be disengaged in the circumferential direction from the engaging portion 43 of the wedge 41. Additionally, each cam projection 49 engages with the associated cam groove 38 to move the associated lock member 36 or 37 radially inwards to the disengaged position shown in FIG. 22, which causes the outer toothed portions 40 of the three lock members 36 and 37 and the internal gear 63 of the ratchet plate 57 to be disengaged from each other to thereby allow the base plate 27 and the ratchet plate 57 to rotate relative to each other. Additionally, the wedge 41 becomes freely movable in the associated guide groove 31 within the area surrounded by the associated flat guide surface 30a, the lock member 37 (the pressed portion 39a) and the rotational cam 47 (the associated cam projection 49). Additionally, the outer peripheral surfaces of the engaging projections 40a of the three lock members 36 and 37 are positioned closer to the inner peripheral side than the inner peripheral surfaces of the three unlocked-state holding projections 57a.

The spring cover 72 is made of metal and is mounted to the right side of the base plate 27. The spring cover 72 is formed from a metal plate by press molding. The base of the spring cover 72 includes a spring housing portion 73 which is non-circular in a side view and the entire left end surface thereof is open. A circular through-hole 74 is formed in the center of the spring housing portion 73. The spring cover 72 is provided on the outer edge of the left end of the spring housing portion 73 with an engaging projection 75, which is V-shaped in cross section and projects toward the outer peripheral side. In addition, the spring cover 72 is provided, on the outer edge of the left end of the spring housing portion 73 at different circumferential positions from the engaging projection 75, with two pressed lugs 76 which project toward the outer peripheral side. The two pressed lugs 76 are flat lugs which lie in a plane orthogonal to the leftward/rightward direction.

The spring cover 72 is installed onto the right side of the base plate 27 with the end of the cam connecting shaft 52 positioned in the circular through-hole 74 and with the spring housing portion 73 positioned between the three welding protrusions 33. Fitting the spring housing portion 73 into the space between the three welding protrusions 33 causes the retaining projections 34 of two of the three welding protrusions 33 to be engaged with two parts of the outer edge of the spring housing portion 73, respectively, and causes the retaining projection 34 of the remaining one welding protrusion 33 to be engaged with the end of the engaging projection 75. Accordingly, when the spring cover 72 is installed onto the right side of the base plate 27, the spring cover 72 becomes integral with the right side of the base plate 27.

Figure 6:
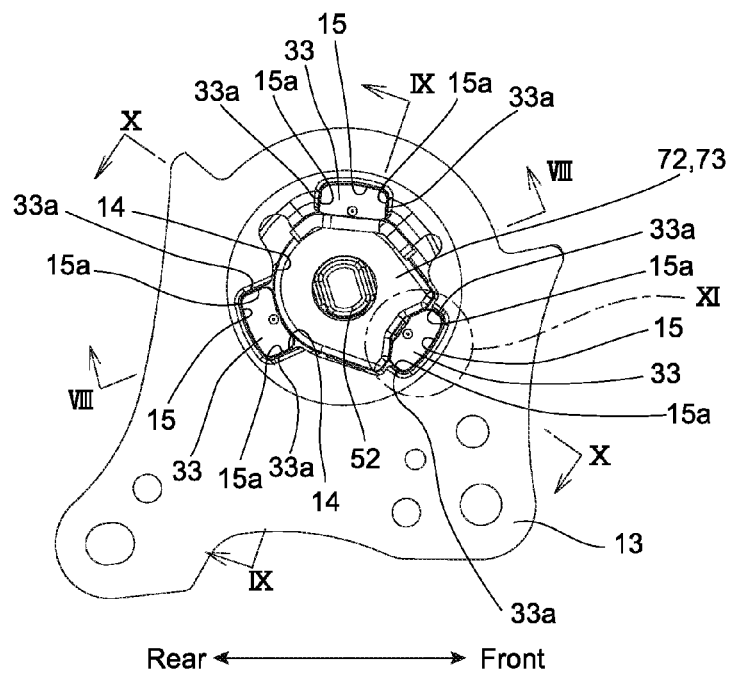
FIG. 6 is a right-side elevational view of the seat reclining apparatus in a locked state and a seat cushion.
Figure 7:
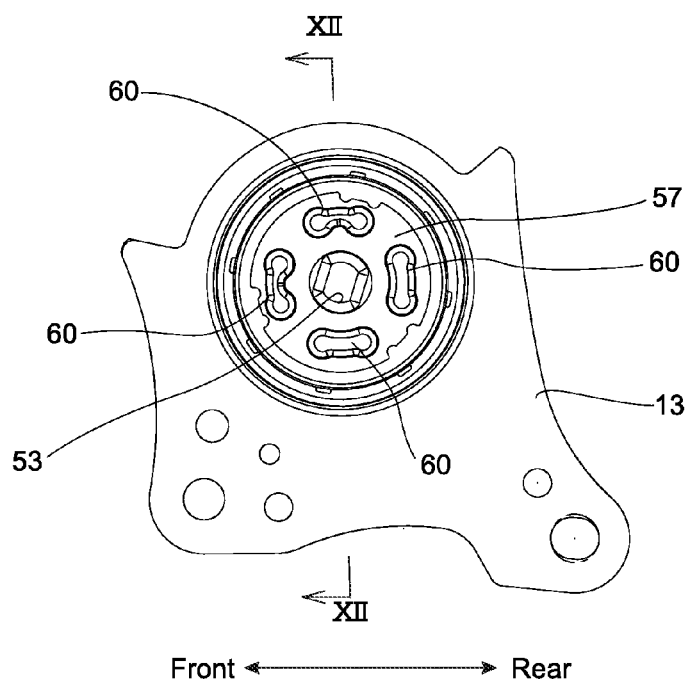
FIG. 7 is a left-side elevational view of the seat reclining apparatus in a locked state and a seat cushion.
Figure 8:
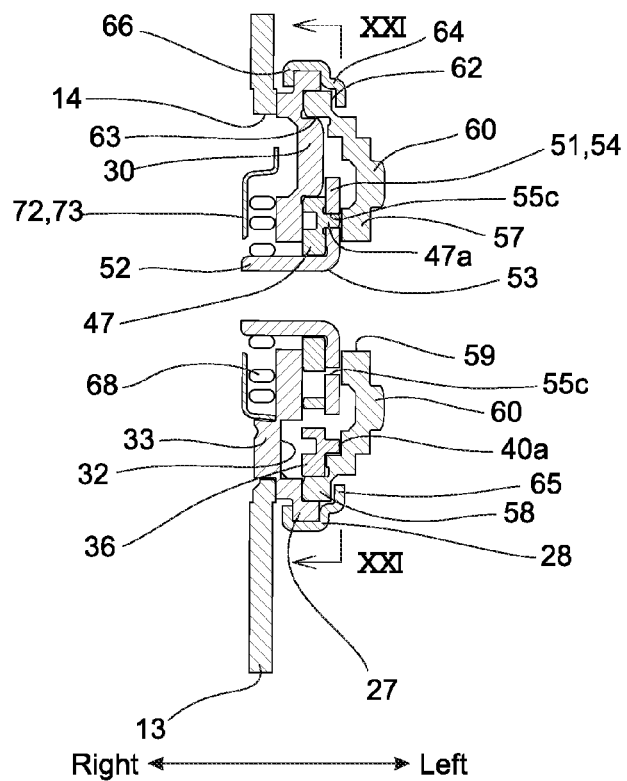
FIG. 8 is a cross sectional view taken along the line VIII-VIII shown in FIG. 6, viewed in the direction of the appended arrows.
Figure 9:
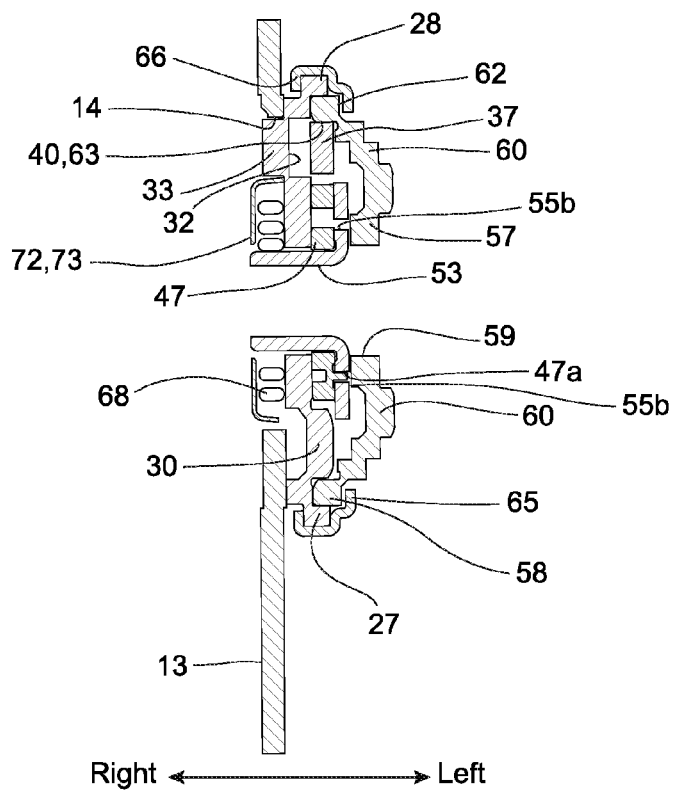
FIG. 9 is a cross sectional view taken along the line IX-IX shown in FIG. 6, viewed in the direction of the appended arrows.
Figure 10:
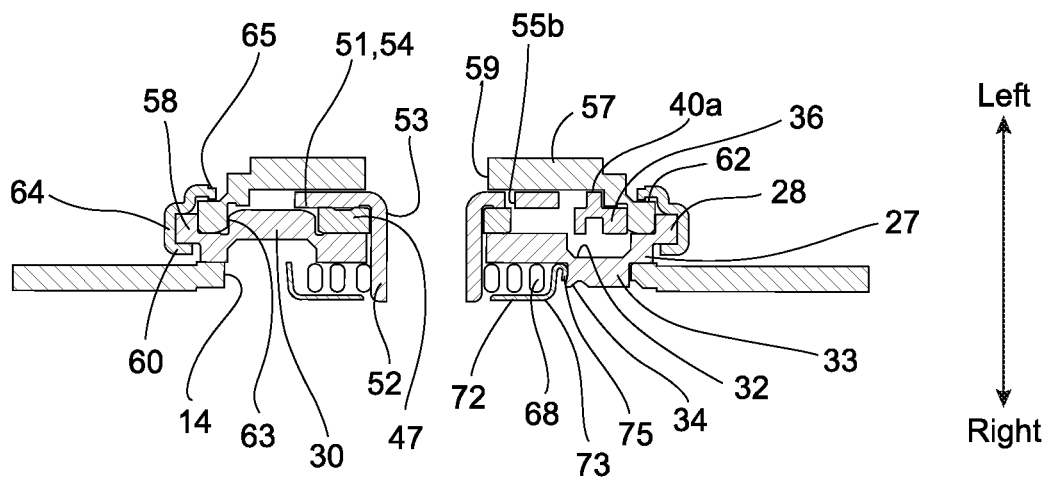
FIG. 10 is a cross sectional view taken along the line X-X shown in FIG. 6, viewed in the direction of the appended arrows.
Figure 11:
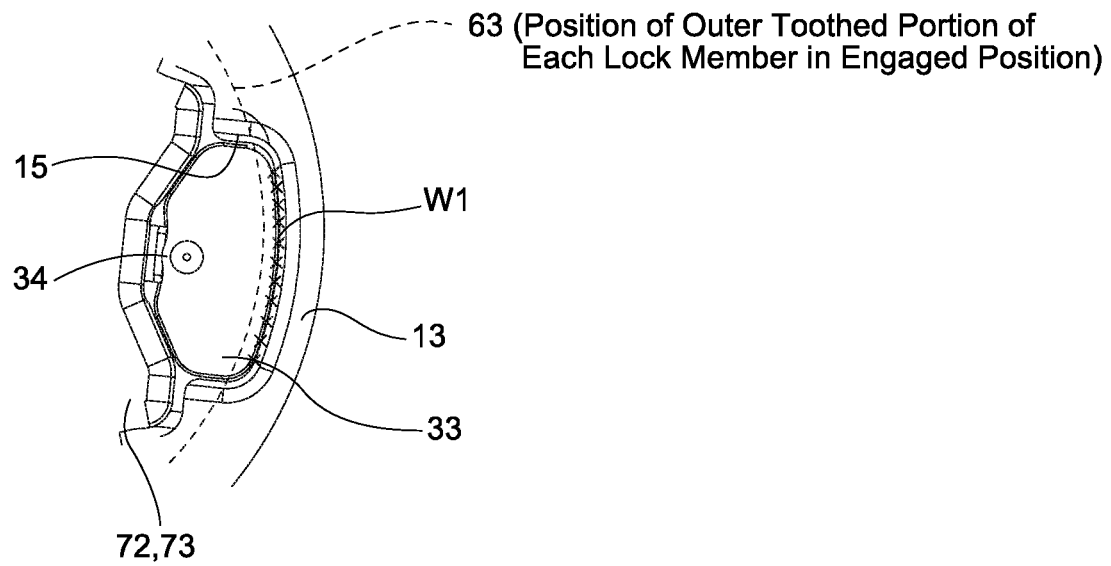
FIG. 11 is an enlarged view of a portion of the seat reclining apparatus which is designated by the Roman numeral XI shown in FIG. 6.

As shown in FIG. 6, the base plate 27 of the seat reclining apparatus 25 is installed onto the rear frame 13 with the three welding protrusions 33 of the base plate 27 respectively engaged in the three engaging holes 15 of the rear frame 13 and with the side end surfaces 33a of each welding protrusion 33 respectively being in surface contact with the pair of flat portions 15a of the associated engaging hole 15. The rear frame 13 and the base plate 27 are fixed to each other by applying a weld W1 (indicated by small cross marks in FIG. 11, hatch lines shown in FIG. 12 and a hatched portion shown in FIG. 27), from the right side of the rear frame 13, to each of three welding portions (only one of which is shown in FIG. 11) each of which extends over a peripheral edge (right edge with respect to FIG. 11) of one engaging hole 15 and the side end surfaces 33a of the associated welding protrusion 33. As shown in FIG. 27, since the right end (upper end with respect to FIG. 27) of the weld zone 33b of each welding protrusion 33 is substantially right-angled in cross sectional shape, the clearance between the peripheral edge of each engaging hole 15 and the weld zone 33b of the associated welding protrusion 33 is almost eliminated, which makes it possible to easily and securely fix each welding protrusion 33 (the weld zone 33b thereof) and the associated engaging hole 15 to each other with a small quantity of the weld W1. Additionally, as shown in FIG. 11, the outer peripheral edge of the right end surface of each welding protrusion 33 (the position at which the weld W1 is applied) is positioned closer to the outer peripheral side than the position of the internal gear 63 (i.e., the positions of the outer toothed portions 40 of the three lock members 36 and 37 when each of the three lock members 36 and 37 is in the engaged position) and the peripheral edges of the three protrusion-corresponding recesses 32 (see FIGS. 11 and 13). In addition, when the base plate 27 is fixed to the rear frame 13, an inner side surface of the rear frame 13 (the outer edge of the seat-cushion-side connecting hole 14) comes in contact with the outer side surfaces of the two pressed lugs 76, which easily and securely prevents the spring cover 72 from coming off the right side of the base plate 27.

On the other hand, the ratchet plate 57 of the seat reclining apparatus 25 is fixed to the seatback frame 16 by respectively engaging the four welding protrusions 60 respectively engaged in the four fitting holes 18 and applying a weld (not shown), from the left side of the seatback frame 16, to an outer peripheral edge of each engaging hole 18 and an outer peripheral edge of the left end surface of the associated welding protrusion 60.

After the rear frame 13 and the seatback side frame 16 are connected to the seat reclining apparatus 25, a connecting shaft (not shown) having a non-circular cross sectional shape which extends leftward from the base end of an operating lever (operating member) 21 (see FIG. 1) is press-fitted into the connecting hole 53 of the cam connecting shaft 52 through the circular through-hole 74 of the spring cover 72 to be fixed to the rotational center shaft 51 (to the connecting hole 53). Therefore, rotating the operating lever 21 about the aforementioned connecting shaft causes the rotational center shaft 51 to rotate with the operating lever 21 (the aforementioned connecting shaft).

Operations of the vehicle seat 10 will be discussed hereinafter.

When no external force is applied to the operating lever 21, the operating lever 21 is held in the non-operating position shown by a solid line in FIG. 1 by the rotational biasing force of the lock spring 68. Additionally, when no external force is applied to the operating lever 21, the rotational cam 47 is in the locked position and the lock member 37 is in the engaged position, so that the seat reclining apparatus 25 is in a locked state. This prevents the seat cushion 11 (the rear frame 13), which is integral with the base plate 27, and the seatback 12 (the pair of seatback side frames 16), which is integral with the ratchet plate 57, from rotating relative to each other. On the other hand, rotating the operating lever 21 counterclockwise with respect to FIG. 1 to the operating position shown by a two-dot chain line in FIG. 1 against the rotational biasing force of the lock spring 68 causes the rotational cam 47 to rotate to the unlocked position, thus causing each of the two lock members 36 and the lock member 37 to move to the disengaged position, so that the seat reclining apparatus 25 comes into an unlocked state. This allows the seat cushion 11 (the rear frame 13), which is integral with the base plate 27, and the seatback 12 (the pair of seatback side frames 16), which is integral with the ratchet plate 57, to rotate relative to each other.

When the seatback 12 (the pair of seatback side frames 16) is in a first-stage locked position shown by a solid line in FIG. 1, rotating the operating lever 21 to the operating position to move the seat reclining apparatus 25 to the unlocked state causes the seatback 12 to rotate (tilt) forward by the rotational biasing force of a rotational biasing spring (not shown) installed in the vehicle seat 10. Thereupon, since the ratchet plate 57 rotates counterclockwise with respect to FIGS. 21 through 23 relative to the base plate 27, the seat reclining apparatus 25 comes into an unlocked holding state (i.e., a state in which the seat reclining apparatus 25 is held in the unlocked state) in which the three engaging projections 40*a* (the outer peripheral surface thereof) that are positioned closer to the inner peripheral side than the inner peripheral surfaces of the three unlocked-state holding projections 57*a* radially oppose (face) (to be in contact with) the inner peripheral surfaces of the three unlocked-state holding projections 57*a*, respectively, as shown in FIG. 23 (which shows a state of the interior of the seat reclining apparatus 25 when the seatback 12 has slightly rotated forward from the first-stage locked position). Therefore, the operating lever 21 is prevented from moving toward the non-operating position (the rotational cam 47 and the lock member 37 are also prevented from moving toward the locked position and the engaged position, respectively), so that the seatback 12 rotates to the aforementioned forwardly-tilted position (shown by a two-dot chain line designated by 12A in FIG. 1) by the rotational biasing force of the aforementioned rotational biasing spring. When the seatback 12 is positioned in between a position (shown in FIG. 23) slightly rotated forward from the first-stage locked position and the forward-tilted position (shown by a two-dot chain line designated by 12A in FIG. 1), the seat reclining apparatus 25 is held in the aforementioned unlocked holding state.

On the other hand, when the seatback 12 is positioned at or behind the first-stage locked position shown by a solid line in FIG. 1, if one rotates the operating lever 21 in the non-operating position to the operating position while applying a rearward force to the seatback 12 (e.g., by the back of an occupant sitting in the vehicle seat 10) to change the seat reclining apparatus 25 to an unlocked state, the seatback 12 rotates rearward. Subsequently, if one returns the operating lever 21 to the non-operating position upon tilting the seatback 12 to a desired rearward-tilted position, the rotational cam 47 moves back to the locked position while each lock member 36 and 37 moves back to the engaged position by the rotational biasing force of the lock spring 68, so that the seatback 12 (the pair of seatback side frames 16) is held at the desired tilted position.

The wedge 41 of the above described embodiment of the seat reclining apparatus 25 is provided with the slide-contact flat surface 45, which comes in surface contact with the adjacent flat guide surface 30*a* of the associated groove-forming projection 30. Therefore, when the seat reclining apparatus 25 is in the locked state, even if forward or rearward loads are exerted on the seatback 12 to thereby cause the aforementioned adjacent flat guide surface 30*a* and the slide-contact flat surface 45 to come into contact with each other with a large force due to, e.g., a vehicle which incorporates the seat reclining apparatus 25 colliding with another vehicle, concentrated loads do not easily occur between the aforementioned adjacent flat guide surface 30*a* (the associated groove-forming projection 30) and the wedge 41.

In addition, since the pressed portion 39*a* of the lock member 37 is a curved surface that is convex toward the wedge 41 though the pressing portion 44 of the wedge 41 is flat in shape, even if an error exits between the shape of the wedge 41 (the pressing portion 44) and the design shape thereof, there is little possibility of the wedge 41 becoming positionally unstable when the rotational cam 47 rotates, so that the operation of the wedge 41 does not easily become unsmooth.

Additionally, since the pressing portion 39*a* of the lock member 37 has a profile that is close to that of the pressing portion 44 of the wedge 41 (has a curved profile that is close to a flat surface), the wedge 41 (the pressing portion 44) or the lock member 37 (the pressed portion 39) easily deforms plastically into the same shape as the pressed portion 39*a* of the lock member 37 or the pressing portion 44 of the wedge 41, respectively, when the pressing portion 44 of the wedge 41 and the pressed portion 39*a* of the lock member 37 come into contact with each other with a large force due to, e.g., a vehicle which incorporates the seat reclining apparatus 25 colliding with another vehicle. If one of the pressing portion 44 of the wedge 41 and the pressed portion 39*a* of the lock member 37 becomes deformed into the same shape as the other, the contact state between the pressing portion 44 of the wedge 41 and the pressed portion 39*a* of the lock member 37 becomes a surface contact state, which reduces the possibility of large concentrated loads occurring therebetween. Accordingly, one or both of the wedge 41 and the lock member 37 can be efficiently prevented from being deformed or damaged.

In addition, the seat reclining apparatus 25 has only one wedge (the wedge 41) while having more than one lock member (the two lock members 36 and the lock member 37). Therefore, when the outer toothed portion 40 of the lock member 37 which is pressed in the locking direction by the wedge 41 is engaged with the internal gear 63 of the ratchet plate 57, the positions of the lock member 37 and the ratchet plate 57 are fixed (a positional reference is determined), and the lock member 37 becomes immovable in the associated guide groove 31. On the other hand, each of the remaining two lock members 36 is allowed to move in a circumferential direction within the gap defined between the associated guide groove 31 and the associated lock member 36, thus being engaged with the internal gear 63 of the ratchet plate 57 while moving, as appropriate, in a circumferential direction within the gap defined between the associated guide groove 31 and the associated lock member 36. Accordingly, since all the three lock members, i.e., the two lock members 36 and the lock member 37, operate with reliability when the rotational cam 47 rotates, the seat reclining apparatus 25 can reliably perform locking and unlocking operations.

Additionally, when the seat reclining apparatus 25 comes into the locked state, the wedge 41 comes into contact with the following three members: the rotational cam 47, the lock member 37 and the base plate 27 (the adjacent flat guide surface 30a of the associated groove-forming projection 30), so that the behavior of the wedge 41 is appropriately controlled.

Additionally, the wedge 41 has the concave surface 46a that forms a clearance between the wedge 41 and the associated curved pressing surface 50 of the rotational cam 47 when facing the associated curved pressing surface 50 of the rotational cam 47 as shown in FIG. 24. The concave surface 46a is a concave surface which faces a protrusion constituting the associated curved pressing surface 50 and has a shape capable of approaching the associated curved pressing surface 50, and accordingly, the clearance between the associated curved pressing surface 50 of the rotational cam 47 and the concave surface 46a when the rotational cam 47 is in the unlocked position is narrow.

If an occupant pushes the seatback 12 rearward or forward when the seat reclining apparatus 25 is in the locked state, a force in the circumferential direction of the base plate 27 is exerted on the outer toothed portion 40 of each of the two lock members 36 and the lock member 37 from the internal gear 63 of the ratchet plate 57, and a component of this force which is directed toward the inner peripheral side becomes a force urging the two lock members 36, the lock member 37 and the wedge 41 toward the inner peripheral side (toward the rotational cam 47 side).

In this state, upon an occupant unlocking the seat reclining apparatus 25, the curved pressing surface 50 of the rotational cam 47 moves away from the wedge 41 in the circumferential direction of the rotational cam 47 (the base plate 27). Thereupon, the wedge 41 which receives the aforementioned component of force (which is directed toward the inner peripheral side) moves toward the rotational cam 47. However, since the clearance between the concave surface 46a of the wedge 41 and the associated curved pressing surface 50 of the rotational cam 47 is narrow (the distance therebetween is small) as mentioned above, a high collision speed of the wedge 41 against the rotational cam 47 does not easily occur even if the concave surface 46a of the wedge 41 collides with the associated curved pressing surface 50 of the rotational cam 47, so that the possibility of a loud sound (noise) of such a collision being produced between the wedge 41 (the concave surface 46a) and the rotational cam 47 (the associated curved pressing surface 50) is small.

Additionally, the pair of small-diameter circular holes 55a, the pair of large-diameter through-holes 55b and the pair of elongated holes 55c are formed in the annular flange 54 that rotates with the rotational center shaft 51, and the three rotation retaining projections 47a are projected from the rotational cam 47 to be engaged in one of the pair of small-diameter circular holes 55a, one of the pair of large-diameter through-holes 55b and one of the pair of elongated holes 55c, respectively. Therefore, when the rotational center shaft 51 rotates, this rotational operating force is transmitted to the three rotation retaining projections 47a via the one of the pair of small-diameter circular holes 55a, the one of the pair of large-diameter through-holes 55b and the one of the pair of elongated holes 55c that are formed in the annular flange 54. The magnitude of the force transmitted from the rotational center shaft 51 (the annular flange 54) to the rotational cam 47 is equal to the magnitude of the rotation moment (torque) of the rotational center shaft 51 (the annular flange 54) divided by the direct distance (distance in a radial direction of the annular flange 54) from the axis of the rotational center shaft 51 to the one of the pair of small-diameter circular holes 55a, the one of the pair of large-diameter through-holes 55b or the one of the pair of elongated holes 55c. Since the pair of small-diameter circular holes 55a, the pair of large-diameter through-holes 55b and the pair of elongated holes 55c, which are formed in the annular flange 54, are positioned closer to the outer peripheral side than the cam connecting shaft 52 (the non-circular center hole 48 of the rotational cam 47), the aforementioned direct distance is longer than the radius of the cam connecting shaft 52 (the radius of the non-circular center hole 48 of the rotational cam 47). Therefore, the force transmitted from the rotational center shaft 51 (the annular flange 54) to the rotational cam 47 does not become too large. Accordingly, even if a force urging the operating lever 21 to rotate beyond a predetermined normal range of rotation is produced (even if a force urging the operating lever 21 to rotate in the direction reverse to the operating position beyond the non-operating position or in the direction reverse to the non-operating position beyond the operating position is produced) as a result of, e.g., a foot of an occupant accidentally coming into contact with the operating lever 21, the possibility of the rotational cam 47 or the rotational center shaft 51 (the annular flange 54) being deformed is small.

Additionally, the three welding portions (to each of which the weld W1 has been applied), which are formed on outer peripheral portions of the three welding protrusions 33 that are projected from the base plate 27, are positioned closer to the outer peripheral side than the outer toothed portions 40 of the three lock members 36 and 37 which are positioned in the engaged position. Therefore, the possibility of heat of the weld W1 reaching and deforming a portion of the bottom of each of the three guide groove 31 on which the associated lock member 36 or 37 slides (e.g., deforming this portion so that it protrudes toward the associated lock member 36 or 37) is small. Additionally, even if heat of the weld W1 reaching each of the three protrusion-corresponding recesses 32, which are respectively positioned directly behind the three welding protrusions 33, and the inner surfaces of the three protrusion-corresponding recesses 32 are deformed by this heat, this deformation has no effect on the operation of each lock member 36 and 37 because the inner surfaces of the three protrusion-corresponding recesses 32 are spaced from the three lock members 36 and 37. Accordingly, the possibility of each lock member 36 and 37 becoming incapable of sliding on an inner side surface (the associated guide groove 31) of the base plate 27 due to heat of the weld W1 is small.

Additionally, since the pair of side end surfaces 33a of each welding protrusion 33 are in surface contact with the pair of flat portions 15a of the associated engaging hole 15, it is possible to secure a large contact area between each welding protrusion 33 (the pair of side end surfaces 33a) and the associated engaging hole 15 (the pair of flat portions 15a). Moreover, since the cross sectional shape (thickness) of each bridging portion 27a (each of the three bridging portions 27a for the three welding protrusion 33) of the base plate 27 is such that the thickness t1 of the portion 27a1 of the bridging portion 27a, which corresponds to the side end surfaces 33a thereof, is greater than the thickness t2 of the portion 27a2 of the bridging portion 27a, which corresponds to the weld zone 33b thereof, the side end surfaces 33a (and the periphery thereof) have a greater mechanical strength than the weld zone 33b (and the periphery thereof) in each welding protrusion 33.

Accordingly, even if a collision load occurs between the pair of side end surfaces 33a of each welding protrusion 33 and the pair of flat portions 15a of the associated engaging hole 15 (in the seat reclining apparatus 25 in a locked state) due to, e.g., a vehicle which incorporates the seat reclining apparatus 25 colliding with another vehicle, the seat reclining apparatus 25 can exhibit high resistance to this collision load.

Although the present invention has been described based on the above illustrated embodiment of the seat reclining apparatus, the present invention is not limited solely to this particular embodiment; various modifications to the above illustrated embodiment of the seat reclining apparatus are possible.

For instance, a modified embodiment of the seat reclining apparatus shown in FIGS. 30 through 33 is possible.

A base plate (first plate) 27' of this modified embodiment of the seat reclining apparatus 25' is provided with three columnar-shaped welding protrusions (engaging protrusions) 33' and three circular protrusion-corresponding recesses 32' which are provided as three pairs, respectively.

Figure 32:
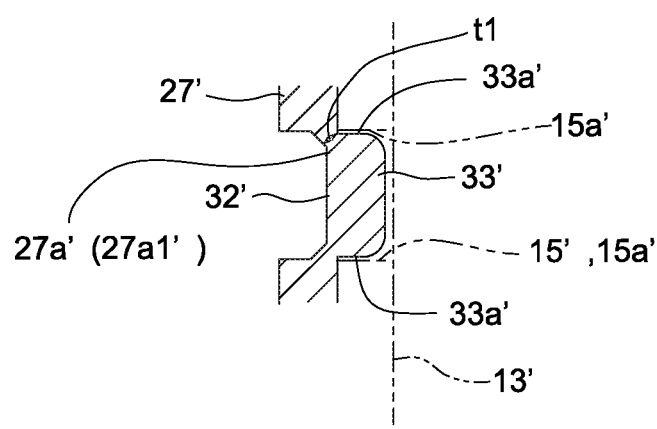
FIG. 32 is a cross sectional view taken along the line XXXII-XXXII shown in FIG. 31.
Figure 33:
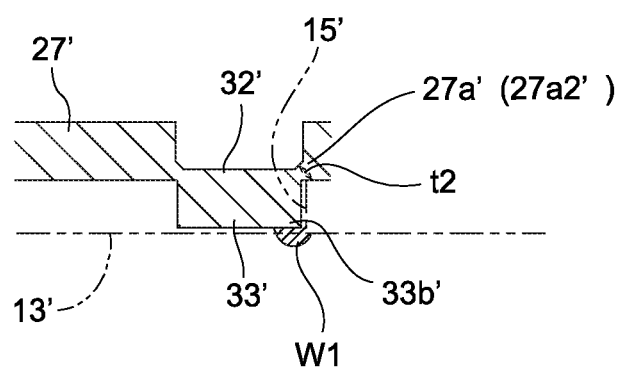
FIG. 33 is a cross sectional view taken along the line XXXIII-XXXIII shown in FIG. 31.

A portion of the base plate 27', which connects the peripheral edges of each welding protrusion 33' and the associated protrusion-corresponding recess 32' to each other as a pair, is formed into a bridging portion 27a' that is annular (circular) in shape (as viewed from a side). A pair of side end surfaces (pressure receiving portions) 33a' are formed on the outer periphery of each welding protrusion 33'. The pair of side end surfaces 33a' of each welding protrusion 33' lie on a circle, about the shaft support hole 29, which passes through a central part of each welding protrusion 33' (each protrusion-corresponding recess 32') as viewed from one side. The radially outer peripheral edge of each welding protrusion 33' (a peripheral edge of each welding protrusion 33' on the outer peripheral side of the base plate 27') is formed as a weld zone (fixed portion) 33b'. Similar to the base plate 27, the base plate 27' is also a metal product formed by press-molding using a pair of molds (a fixed mold and a movable mold; not shown), and the cross sectional shape of the peripheral edge of the right end of each welding protrusion 33' varies according to positions in a circumferential direction of this welding protrusion 33'. Specifically, the side end surfaces 33a' of each welding protrusion 33' are somewhat roundish in cross sectional shape as shown in FIG. 32, whereas the right end of the weld zone 33b' of each welding protrusion 33' is substantially right-angled in cross sectional shape as shown in FIG. 33. Additionally, the cross sectional shape (thickness) of each bridging portion 27a' (each of the three bridging portions 27a' for the three welding protrusion 33') varies according to positions in a circumferential direction of the associated welding protrusion 33'. Specifically, the thickness t1 (see FIG. 32) of a portion (thick-wall portion) 27a1' of the bridging portion 27a' which corresponds to the side end surfaces 33a' thereof is greater than the thickness t2 (see FIG. 33) of another portion (thin-wall portion) 27a2' of the bridging portion 27a' which corresponds to the weld zone 33b' thereof.

Figure 30:
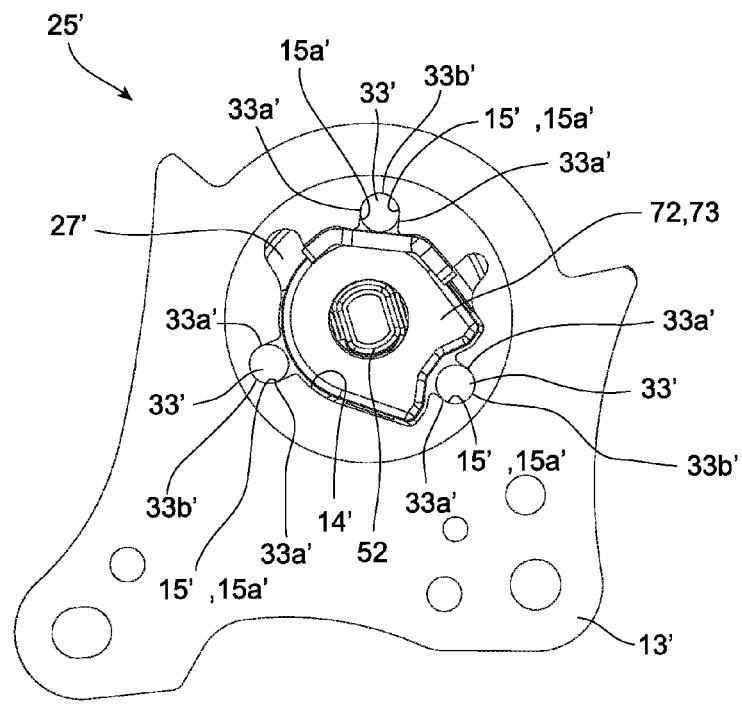
FIG. 30 is a view similar to that of FIG. 6, showing a modified embodiment of the seat reclining apparatus.
Figure 31:
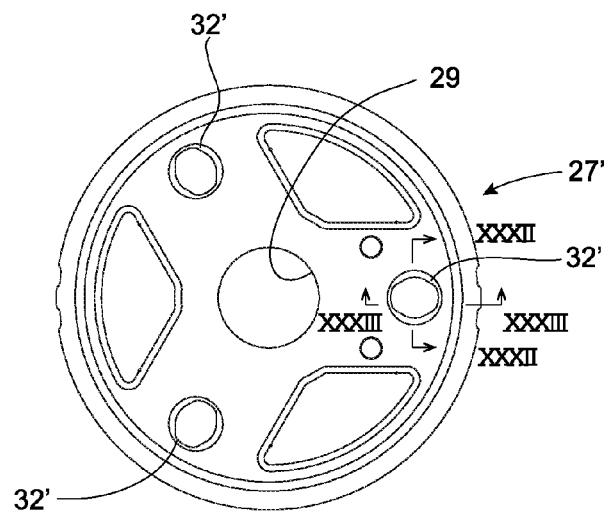
FIG. 31 is a left side elevational view of the base plate of the modified embodiment of the seat reclining apparatus shown in FIG. 30.

As shown in FIG. 30, a rear frame 13' of the seat reclining apparatus 25', which corresponds to the rear frame 13 of the seat reclining apparatus 25, is provided with a seat-cushion-side connecting hole 14' having three substantially-circular engaging holes 15'. The base plate 27' of the seat reclining apparatus 25' is installed onto the rear frame 13' with the three welding protrusions 33' respectively engaged in the three engaging holes 15' and with the pair of side end surfaces 33a' of each welding protrusion 33' respectively made in surface contact with the pair of flat portions 15a' of the associated engaging hole 15'. The rear frame 13' and the base plate 27' are fixed to each other by applying a weld W1 (see FIG. 33), from the right side of the rear frame 13', to each of three welding portions, each of which extends over a peripheral edge of the associated engaging hole 15' and the side end surfaces 33a' of the associated welding protrusion 33'. As shown in FIG. 33, since the right end of the weld zone 33b' of each welding protrusion 33' is substantially right-angled in cross sectional shape, the clearance between the peripheral edge of each engaging hole 15' and the weld zone 33b' of the associated welding protrusion 33' is almost eliminated, which makes it possible to easily and securely fix each welding protrusion 33' (the weld zone 33b' thereof) and the associated engaging hole 15' to each other with a small quantity of the weld W1.

Additionally, since the pair of side end surfaces 33a' of each welding protrusion 33' are in surface contact with the pair of flat portions 15a' of the associated engaging hole 15', and also since the thickness t1 of the portion 27a1' of the bridging portion 27a', which corresponds to the side end surfaces 33a' thereof, is greater than the thickness t2 of the portion 27a2' of the bridging portion 27a', which corresponds to the weld zone 33b' thereof, the side end surfaces 33a' (and the periphery thereof) are greater in mechanical strength than the weld zone 33b' (and the periphery thereof). Accordingly, even if a collision load occurs between the pair of side end surfaces 33a' of each welding protrusion 33' and the pair of flat portions 15a' of the associated engaging hole 15' due to, e.g., a vehicle which incorporates the seat reclining apparatus 25' colliding with another vehicle, the seat reclining apparatus 25' can exhibit high resistance to this collision load.

Additionally, it is possible for each welding protrusion (33 or 33') and the peripheral edge of the associated engaging hole (15 or 15') to be fixed to each other by a fixing means other than welding (e.g., by press-fitting or swaging).

It is possible for the ratchet plate 57 and the seatback frame 16 to be fixed to each other in a fixing manner similar to that between the base plate (27 or 27') and the rear frame (13 or 13').

Additionally, it is possible for the base plate (27 or 27') and the seatback frame 16 to be fixed to each other and for the ratchet plate 57 to be fixed to the rear frame (13 or 13') in a fixing manner similar to that between the base plate (27 or 27') and the rear frame (13 or 13') of the above described embodiment (or the above described modified embodiment).

In addition, the left rear frame (13 or 13') (the left seat cushion frame) and the left seatback frame 16 can be connected to each other via the seat reclining apparatus (25 or 25') instead of the right rear frame (13 or 13') that is fixed to the right seat cushion frame. Additionally, it is possible to connect the left and right rear frames (13 or 13') and the left and right seatback frames 16 to each other via left and right seat reclining apparatuses (25 or 25'), respectively, and connect the rotational center shafts 51 of the left and right seat reclining apparatuses (25 or 25') to each other via a connecting pipe, or the like, so that the left and right seat reclining apparatuses (25 or 25') move in synchronization with each other.

Since the wedge 41 is symmetrical in shape with respect to the straight line L1 as shown in FIG. 25, the wedge 41 can also be applied to the left seat reclining apparatus (25 or 25') in the case where the seat reclining apparatus (25 or 25') is installed to each of the left and right sides of the vehicle seat 10 (or in the case where the seat reclining apparatus (25 or 25') is installed only onto the left side of the vehicle seat 10).

Additionally, it is possible to form the pressed portion 39a of the lock member 37 into a linear (flat) shape and form the pressing portion 44 of the wedge 41 into a curved surface (corresponding to the curved surface of the pressed portion 39a in the above described embodiment, which is smaller in curvature than the engaging portion 43 of the wedge 41) which is convex toward the pressed portion 39a.

Figure 34:
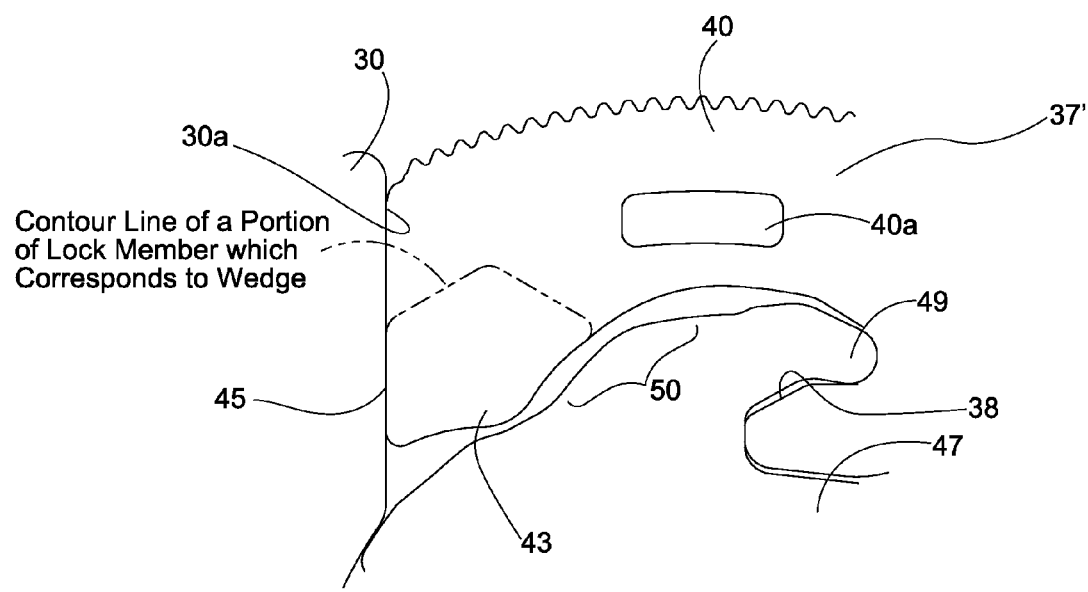
FIG. 34 is a view similar to that of FIG. 24, showing another modified embodiment of the seat reclining apparatus.

Additionally, as shown in FIG. 34, the lock member 37 and the wedge 41 can be replaced by an integral-type lock member 37', the shape of which corresponds to the shape of an integral combination of the lock member 37 and the wedge 41 (note that a two-dot chain line shown in FIG. 34 shows a contour line of a portion of the integral-type lock member 37' which corresponds to the wedge 41).

The seat reclining apparatus according to the present invention can be provided with a plurality of wedges each of which corresponds to the wedge 41, and a plurality of lock members (each of which has the wedge-engaging groove 39) can be pressed by the plurality of wedges. In this case, the number of the plurality of wedges can be equal to or less than the number of the plurality of lock members.

It is possible to omit the wedge 41.

Additionally, the curved pressing surface 50 of the rotational cam 47 is not required to be a curved surface so long as it is formed into a shape that is convex toward the concave surface 46a of the wedge 41; on the other hand, the concave surface 46a of the wedge 41 is also not required to be a curved surface so long as it is formed into a shape that is concave toward the opposite side from the associated curved pressing surface 50 of the rotational cam 47.

Additionally, it is possible for the rotational center shaft 51 to be provided, on the annular flange 54 side thereof, with rotation retaining projections corresponding to the rotation retaining projections 47a and for the rotational cam 47 to be provided with a small-diameter circular hole(s), a large-diameter through-hole(s) and an elongated hole(s) corresponding to the small-diameter circular hole(s) 55a, the large-diameter through-hole(s) 55b and the elongated hole(s) 55c, respectively.

Additionally, the number of rotation retaining projections 47a and the number of holes 55a, 55b and 55c can each be one in either case where rotation retaining projections corresponding to the three rotation retaining projections 47a and holes corresponding to the holes 55a, 55b and holes 55c are formed on the rotational cam 47 and the rotational center shaft 51 or the rotational center shaft 51 and the rotational cam 47, respectively.

Additionally, the three engaging holes (15 or 15') of the rear frame (13 or 13') can be formed as bottomed holes the ends of which on the opposite side of the rear frame (13 or 13') from the base plate 27 side are closed, rather than as through-holes.

Additionally, a through-hole (as a substitution for the bearing hole 29) greater in diameter than the bearing hole 29 can be formed in the center of the base plate (27 or 27') to install the lock spring 68 in this through-hole (within the plate thickness of the base plate (27 or 27')).

Figure 2:
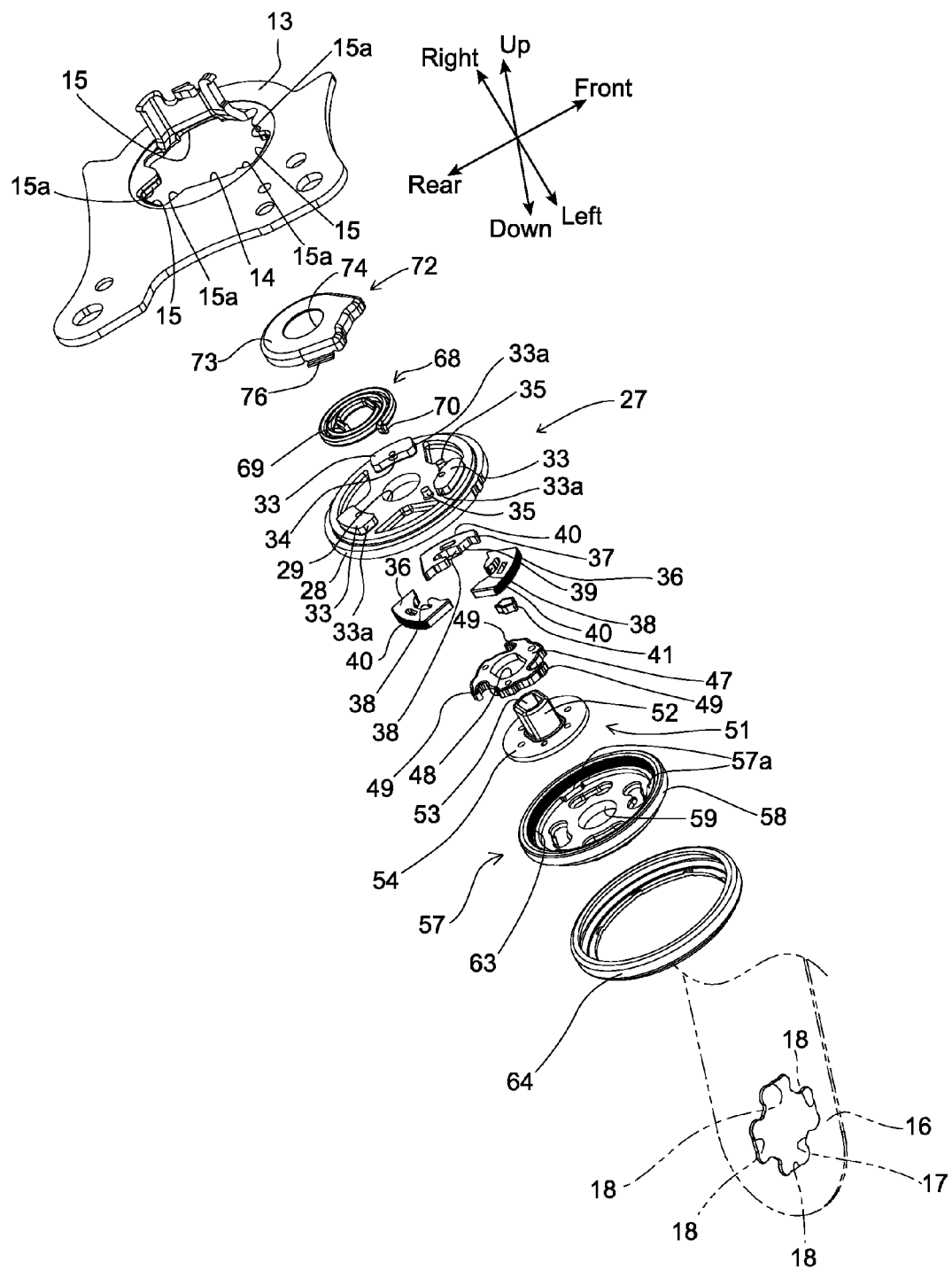
FIG. 2 is an exploded perspective view of the seat reclining apparatus.

Additionally, the lock spring 68 and the spring cover 72 can be installed onto the left side of the ratchet plate 57, or a through-hole (as a substitution for the bearing hole 59) greater in diameter than the bearing hole 59 can be formed in the center of the ratchet plate 57 to install the lock spring 68 (which is installed onto the left side of the ratchet plate 57) in this through-hole (within the plate thickness of the ratchet plate 57). In this case, the inner side of the seatback frame 16 (the edge of the seatback-side connecting hole 17), that is shown by two-dot chain lines in FIG. 2, is made to contact the outer peripheries of the two pressed lugs 76.

The seat reclining apparatus (25 or 25') can be modified to be a so-called swing-pawl type in which each lock member (pawl) is allowed to move not linearly in a radial direction of the base plate (27 or 27') relative to the base plate (27 or 27') but also in a radial direction of the base plate (27 or 27') while swinging relative to the base plate (27 or 27').

In this case, the circumferentially opposite surfaces of each lock member 36 and 37 that respectively face the flat guide surfaces 30a in the associated guide groove 31 can be formed as flat surfaces, or the flat guide surfaces 30a can be replaced by curved guide surfaces while the circumferentially opposite surfaces of each lock member that respectively face the aforementioned curved guide surfaces 30a can be formed as curved surfaces (surface contact portions) which can be in surface contact with the aforementioned curved guide surfaces 30a.

The seat reclining apparatus (25 or 25') can be modified into a so-called release type that incorporates a release plate which is linked with the rotational cam 47 and the three lock members 36 and 37 instead of omitting the three cam projections 49 from the rotational cam 47.

Additionally, the number of the welding protrusions (33 or 33') is not limited to three.

Furthermore, the aforementioned connecting shaft (not shown) of the operating lever 21 can be retained so as not to come off the connecting hole 53 by installing a push nut to the end of the connecting shaft after the connecting shaft is inserted into the connecting hole 53.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A seat reclining apparatus comprising:
a first plate which is fixed to one of a seat cushion frame and a seatback frame;
a second plate which is fixed to the other of said seat cushion frame and said seatback frame to be rotatable relative to said first plate; and
a lock mechanism which switches between a locked state in which said first plate and said second plate are prevented from rotating relative to each other and an unlocked state in which said first plate and said second plate are allowed to rotate relative to each other,
wherein said first plate comprises:
an engaging protrusion which is formed on one side of said first plate and fixedly engaged in a holding portion which is formed in said one of said seat cushion frame and said seatback frame as one of a through-hole and a bottomed hole; and a protrusion-corresponding recess which is formed on the other side of said first plate to be recessed toward said one side of said first plate at a position corresponding to said engaging protrusion, wherein said engaging protrusion comprises a pair of pressure receiving portions which is formed on a peripheral edge of said engaging protrusion and engages with an inner peripheral surface of said holding portion so that said inner peripheral surface receives a force in a circumferential direction, about a rotational center of said first plate and said second plate which rotate relative to each other, from said holding portion when a load is exerted on said seatback frame in said locked state, wherein said first plate includes an annular bridging portion which connects said peripheral edge of said engaging protrusion and a peripheral edge of said protrusion-corresponding recess to each other, said annular bridging portion including at least one thin-wall portion and at least one thick-wall portion which is greater in wall thickness than said at least one thin-wall portion and formed at a position corresponding to said pair of pressure receiving portions, wherein said pair of said pressure receiving portions is provided on said peripheral edge of said engaging protrusion, said pair of pressure receiving portions being spaced from each other in said circumferential direction about a rotational center of said first plate and said second plate which rotate relative to each other, and wherein said at least one thick-wall portion of said annular bridging portion includes a pair of said thick-wall portions, said thick-wall portions corresponding to said pressure receiving portions, respectively, provided on said peripheral edge of said engaging protrusion.

2. The seat reclining apparatus according to claim 1, wherein each of said pressure receiving portions includes a flat surface, and wherein a portion of said inner peripheral surface of said holding portion which faces said each pressure receiving portion includes a flat surface.

3. The seat reclining apparatus according to claim 1, wherein said peripheral edge of said engaging protrusion comprises a fixed portion which is formed at a position corresponding to said thin-wall portion and fixed to said holding portion.

4. The seat reclining apparatus according to claim 1, wherein said engaging protrusion is substantially rectangular in shape.

* * * * *